United States Patent [19]

Prockup

[11] Patent Number: 5,765,101
[45] Date of Patent: Jun. 9, 1998

[54] PORTABLE VHF RECEIVER/TAPE RECORDER CALIBRATOR

[75] Inventor: Kenneth M. Prockup, Emmaus, Pa.

[73] Assignee: The United States of America as represented by the Secretary of the Navy, Washington, D.C.

[21] Appl. No.: 590,309

[22] Filed: Jan. 23, 1996

[51] Int. Cl.⁶ .................................................. H04B 1/04
[52] U.S. Cl. ........................ 455/113; 455/114; 455/126
[58] Field of Search ........................ 455/89, 91, 67.1, 455/44, 114, 115, 67.3, 116, 70, 126; 331/159

[56] References Cited

U.S. PATENT DOCUMENTS 3,571,760  3/1971  Edmu ........................... 332/20
5,507,015  4/1996  Karczewski et al. ........... 455/116

*Primary Examiner*—Nguyen Vo
*Assistant Examiner*—Darnell R. Armstrong
*Attorney, Agent, or Firm*—Ron Billi; Louis Allahut

[57] ABSTRACT

A calibrated VHF/FM source for use in correcting tape recorder and receiver errors which consolidates these functions in a lightweight rack using commercial test parts and maintains a high precision of accuracy by having the system monitor it's own output and correct the distortion and amplitude errors attributable to the nonlinear behavior of the a Voltage Variable Capacitance diode (VVC diode) of the Voltage Capactive Oscillator (VCO) of the VHF FM transmitter.

20 Claims, 30 Drawing Sheets

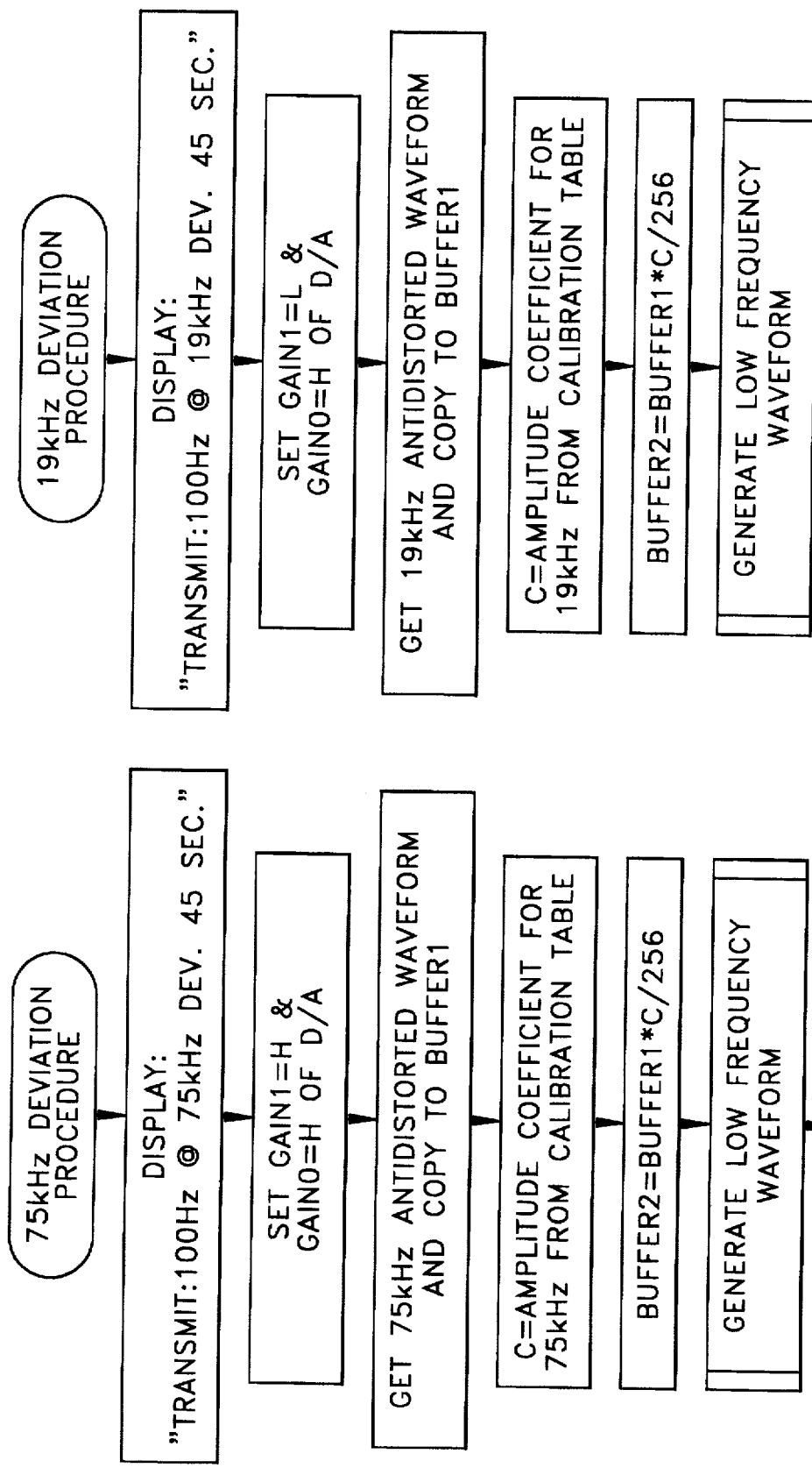

PORTABLE VHF RECEIVER/TAPE RECORDER CALIBRATOR

The invention described herein may be manufactured and used by or for the Government of the United States of America for governmental purposes without payment of any royalties thereon or therefor.

BACKGROUND OF THE INVENTION

The present invention relates to a system to generate VHF/FM calibration tones for use in correcting tape recorder and receiver errors.

Current systems used to generate VHF/FM calibration tones comprise a collection of individual pieces of equipment such as the Hewlett Packard 8904A signal source, Marconi 2018 RF signal generator, Marconi 2305 modulation meter and a ruggized PC AT class computer controlling the equipment through an IEEE 488 interface buss. The total system cost of such a collection is expensive (in excess of $30,000 each) and heavy (approximately 275 pounds). Due to the large size and excess weight of the current systems they are limited to large data collection platforms (for example the Navy's P-3). Smaller platforms (i.e. S-3) do not have the room to store this test equipment and the weight makes it difficult for a technician to setup/tear down the equipment before and after every data collection mission.

Also in current systems used to generate VHF/FM calibration tones for use in correcting tape recorder and receiver errors, each piece of equipment must be calibrated approximately every 6 months. Each individual piece of the system is calibrated but the entire system as a whole is not calibrated. To maintain frequency phase lock loops are the current techniques used. But phased locked loops cause problems when the modulation frequency is low, i.e. 2 Hz, the phase lock loop technique breaks down and results in an unlocked system creating large distortion at low modulation frequencies.

Current modulation meters do not measure deviations below a modulation frequency of 10 hertz. Yet, current systems are operated down to 2.0 Hz range and are therefore unchecked by the current set of modulation meters in the range below 10.0 Hertz. Also, to deal with the signal distortion resulting from the nonlinear behavior of the voltage variable capacitance (VCC) diode, current techniques modulate the VVC diode with a small signals to minimize distortion.

Therefore to overcome these problems it is the object of this invention to generate VHF/FM calibration tones for use in correcting tape recorder and receiver errors and to consolidate these functions into a lightweight rack using commercial test parts.

A further object of this invention is to fit the total system in a small easily transported package size.

A further object of this invention is to incorporate the calibration tone generator functions into one integrated easily calibrated system.

A further object of this invention is to avoid the use of phased locked loops and thus accurately use low modulation frequencies, in the 2 Hz range, and avoid the problems of an unlocked system with large distortions.

A further object of this invention is maintain a high precision of accuracy in the total system and have the system monitor it's own output and correct the distortion and amplitude errors attributable to the nonlinear behavior of the a Voltage Variable Capacitance diode (VVC diode) of the Voltage Capactive Oscillator (VCO) of the VHF FM transmitter.

SUMMARY OF THE INVENTION

This invention modulates a fixed RF carrier (for example a 167.5 MHZ carrier) with a user selected deviation, such as 75.0 KHz, 19.0 KHz, 10.0 KHz of deviation, at a user selected modulation frequency such as 100 Hz. In addition, the invention can modulate a user selected deviation, such as 19.0 KHz, at a range of user selected modulation frequencies, such as between 2.0 Hz to 63,000 Hz or broadband white noise. These deviation/modulation frequencies can be manually selected from a predefined list or automatically generated from a predefined sequence. These calibration tones are recorded on a data recorder, and later processed with the collected data of the system and the calibration tones are used to correct for tape recorder and receiver errors.

By incorporating a soft key menu with a LCD display, the invention is easy to operate and thus the operator does not need to know how to operate the individual pieces of electronic test equipment, as in previous systems, and the microprocessor used in the invention controls and integrates all parts of the current system.

By counting the cycles of the transmitted output the R.F. frequency shift generated by a DC voltage applied to the Varactor Diode is measured and a profile of the transmitting system is determined and thus an accuracy of ±0.05 dB of deviation is maintained, indifferent of component aging, and temperature. This allows for high accuracy in all environments, and increases the cycle time between calibration/maintenance of the invention. Cycle counting also serves as a quick check to determine if the unit is completely functional and alerts the operator if not. By being DC coupled, cycle counting gives very accurate deviation below 10.0 Hz of modulation, were the current system as well as all other modulation meters do not response at or below 10 Hz of modulation due to their design. This high degree of accuracy is possible because of the anti-distortion correction of the system. In this design the voltage variable capacitance diode is operating with a very high modulated voltage and because of it's nonlinear characteristics, a strong distortion in the 2nd harmonic is generated. This is desirable only because at small modulated voltage, a Phase Lock Loop system is required where a phase lock loop is very difficult to frequency modulate at frequencies less than 10 Hz. The undesirable byproduct of 2nd harmonic distortion is canceled by using a anti-distorted sine wave look up tables calculated for each level of deviation. The end result is a accurate deviation even below 2.0 Hz modulation at a trade off of some carrier frequency drift of less than 1 KHZ which can be corrected by using the cycle counting procedure.

Also by using this invention in conjunction with a DC coupled digital waveform source, the modulation frequency can go well below 2.0 Hz and maintain a low distorted waveform (less than −50 dBc) and maintain high accuracy in deviation.

The system is easy to operate by depressing one switch to initiate the predefined sequence of events. This eliminates the possibility of human error in the current system due to computer operator error, cable disconnected, or computer interface connection between the various pieces of test equipment.

By being low cost as well as small and lightweight, this system can be used in grooming of Receiver/Tape recorders in all VHF/FM calibration.

There are no variable potentiometers (trimmers) within this system and all alignment is done by entering a number onto a keypad, were a error correction is calculated and applied during the alignment/maintenance phase.

DETAILED DESCRIPTION

Figure 1:
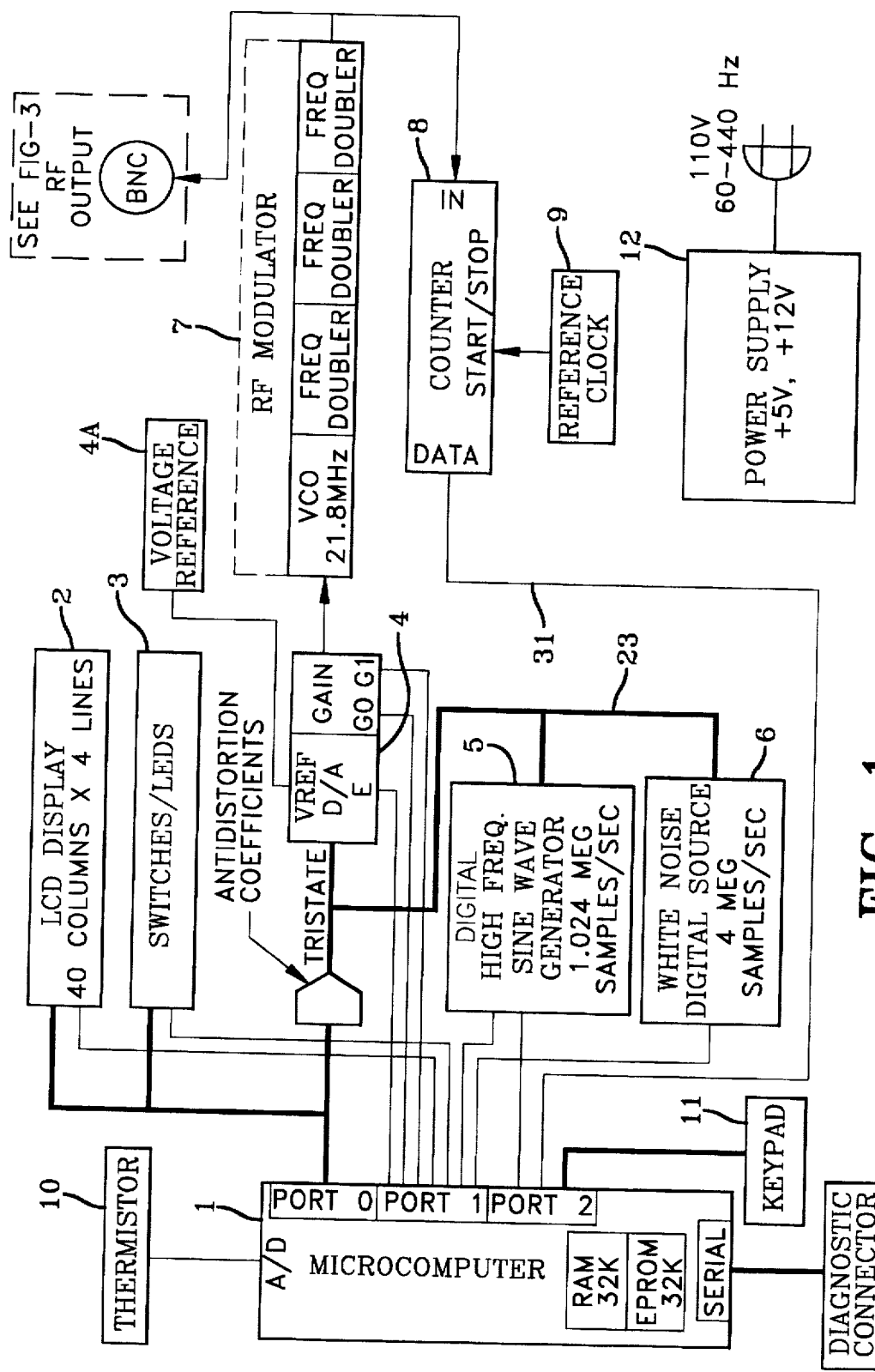
FIG. 1 is a simplified block diagram of an embodiment of a VHF/FM calibration tone generator.

A block diagram of a system embodying the VHF/FM calibration tones generator is shown in FIG. 1. A microcomputer (1) controls the operation of the system and generates the waveforms for frequencies of 100 Hz and below. One embodiment uses a low cost microprocessor, such as the Zilog Z80180 microprocessor with 32K EPROM and 32K battery backup RAM, and low cost I/O, such as the Intel 8255, as the parallel I/O interface. For the human interface, a 40 column by 4 line LCD display (2) is used. The two lower rows of this display in conjunction with six switches (3) serve as a soft menu to select the desired function.

For low frequencies of modulation (below 100 Hz), the D/A (4) is connected directly to the microprocessor port via a tri-state bus. Current off-the-shelf D/A's, such as the Microlinear ML2341, have a built in gain stage controlled by gain 0 (G0) and gain 1 (G1) inputs in 6 dB steps. This is ideal for deviation steps of 75 kHz, 19 kHz and 10 kHz which are almost 6 dbs apart allowing for 8 bit of operation at all levels of deviation. Because of the gain0 and gain1, only a 8 bit D/A is needed, reducing cost and material.

At high frequencies, the throughput of the microprocessor and 8255 (I/O) would prohibit generating the desired waveform as described above. Rather than using a fast microcomputer (i.e. Intel 80960 or D.S.P.), the high frequencies and the white noise are generated with separate logic (5). This reduces the power requirement by not running the microprocessor 1 at high frequencies and allowing the dynamic power of the high frequency to be inhibited when the high frequency waveforms are not being generated. The output of this stage is interconnected to the D/A (4) via a tri-state buss 23.

These logic blocks (5) & (6) can be easily integrated within an off the shelf Field Programmable Gate Array to further reduce power, cost and size.

The output of the D/A (4) is directly fed into the Voltage Variable Capacitance (VVC) diode of any off the shelf VHF FM transmitter (7). This VHF FM transmitter consists of a quartz crystal VCO operating in a modified Colpitts oscillator using the third overtone. This output is then doubled in frequency, buffered, attenuated and then sent to the external output (RF OUTPUT).

The output of the transmitter (7) is also fed back into a cycle counting logic measured deviation hardware (8). The cycle counting hardware records a profile of the transmitter 7 characteristics and uses the profiles via the microprocessor (1) to correct for deviation drift caused by both aging and temperature. The cycle counting hardware (8) also reduces the need for factory calibration, by calibrating the system every time power is applied, if the temperature changes more than 5° F., and during preset time intervals. This allows the system to be accurate to with ±0.05 dB in deviation. The accuracy of the cycle counting is determined by the accuracy of the reference clock (9). By using a difference of two measurements in the cycle counting firmware, the accuracy of the crystal is relaxed to 100 ppm as long as the short term drift between the difference measurement (for example 4 seconds) is very low. The cycle counting (8) can also be used to correct for carrier drift by applying a calculated offset voltage to the D/A (4).

A thermistor (10) is connected to the microprocessor (1) to compensate the system for temperature changes, as well as, to initiate the cycle counting firmware when temperature changes more than 5° F. This corrects for the 0.1 dB deviation drift per 13° F. temperature change of the VHF FM Transmitter.

The numeric keypad (11) is used during the calibration/alignment phase of this system. To simplify the maintenance/alignment procedure no trimmers (potentiometers) are used in this design. The operator goes through an alignment procedure preprogrammed in the firmware. This procedure aligns each frequency and deviation point. The operator enters the deviation measured for each data point. This value is entered in the keypad (11) and a corrected value is calculated from the error and used as the new calibration value. The profile of deviation versus frequency of the above procedure is used to correct for the minor high frequency rolloffs in the D/A 4 and the voltage variable capacitance diode of the RF modulator 7.

The power requirement needed for this embodiment of the system is 5V at 350 mA and 12V at 100 mA. The power supply (12) is available from many vendors off the shelf. By being low power, this system can operate off a 12V camcorder battery for five continuous hours between charge.

DIGITAL HIGH FREQUENCY GENERATOR

Figure 2:
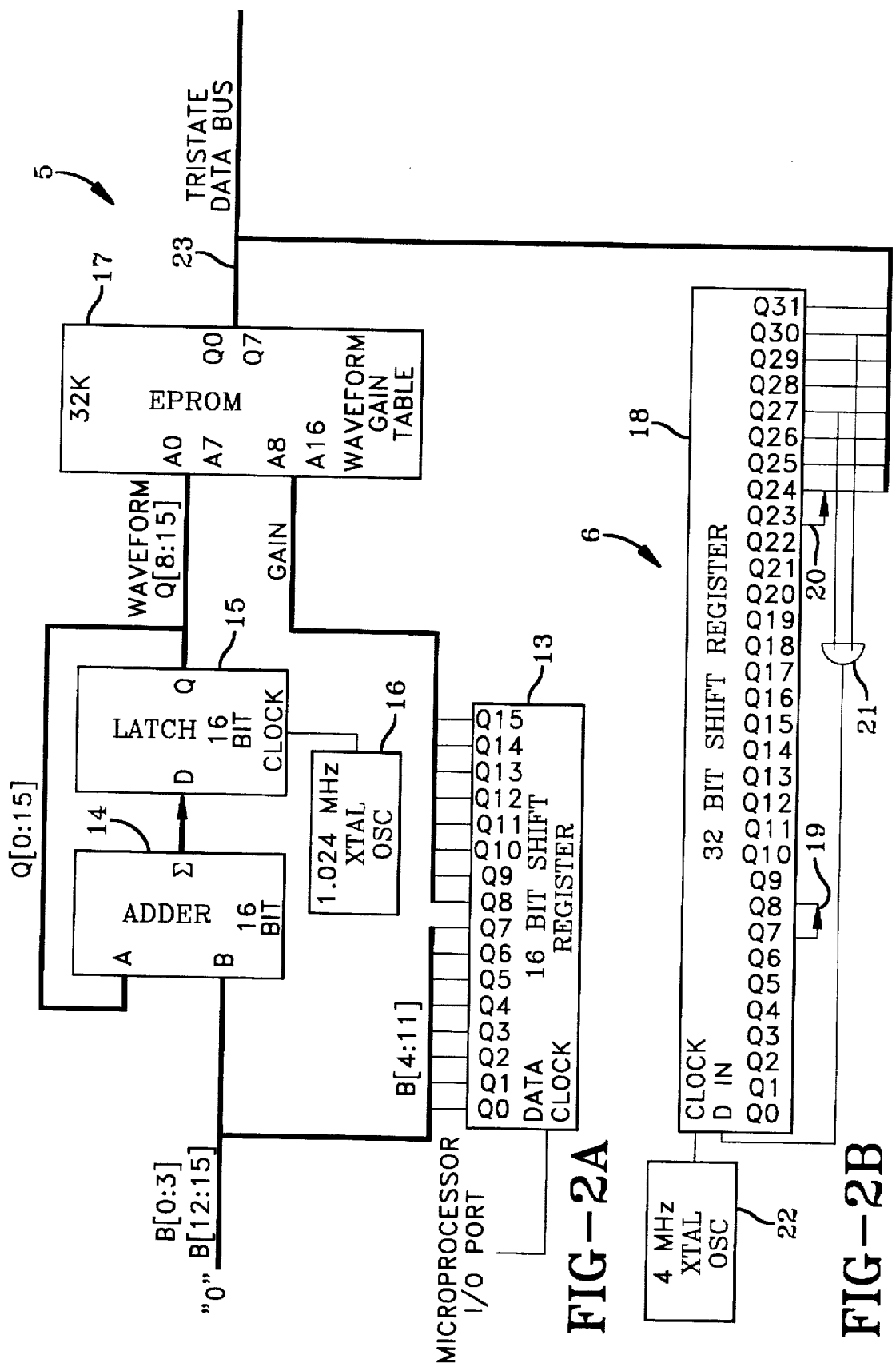
FIG. 2A is a high frequency digital waveform generator used in the VHF/FM calibration tone generator.
FIG. 2B is a white noise source generator for use in the a VHF/FM calibration tone generator.

FIG. 2 is composed of FIGS. 2A and 2B so as to break down the logic description for the high frequency section as well as the white noise source. The desired frequency is sent from the microprocessor 1 in serial format (to reduce the number of parallel I/O lines.) to the high frequency section via a 16 bit shift register (13). The parallel outputs of the shift register (13) go to the adder (14) and the EPROM (17). A pointer to the waveform lookup table is generated by the adder (14) and latch (15) combination as shown. The desired frequency is determined by entering the appropriate step size via the shift register (13) in the B input of the adder 14. This value is added to the previous result and outputted at the next clock pulse determined by the clock (16). The clock frequency chosen was 1.024 MHz allowing for 1.024 mega samples per second to be generated. This allows for precise frequencies in exact multiples of 1000 Hz. Using a high sampling rate guarantees that the waveform generated will have enough data points to guarantee a sine wave RMS accuracy of less than 0.03 dB even at 63,000 Hz without the need for anti-aliasing filtering. The waveform pointer from the latch (15) is fed into the lower 8 address lines of EPROM (17). The EPROM 17 converts the pointer values to the desired sine wave with the appropriate 2nd harmonic antidistortion. Because of the low cost of today's Proms, the upper 7 address lines of the EPROM contain the data repeated at different amplitude levels eliminating the need to scale the waveform amplitude in hardware. The amplitude level is determined by the microprocessor 1 of FIG. 1 and sent via the shift register (13) to these address lines. Two sets of anti-distorted waveforms are stored in the EPROM data due to the increase in 2nd harmonic distortion at very high frequencies (above 20 KHz). The selection of these two data sets is controlled by the address line of EPROM 17.

The white noise source is generated by a 32 stage shift register (18) using two inverters (19) and (20) and an exclusive OR (21) for the feedback. This generates $2^{31}$ random numbers. The upper 8 bits of the shift register (18) outputs are sent to the D/A (4) via the tri-state bus 23. This random sequence is repeated every 536 seconds using a clock of 4.0 MHz (22). This clock frequency was chosen so the Guassian Uassian distribution of the random sequence will be less than 0.5 dB loss at 100 KHz.

DEVIATION CORRECTOR

Figure 3:
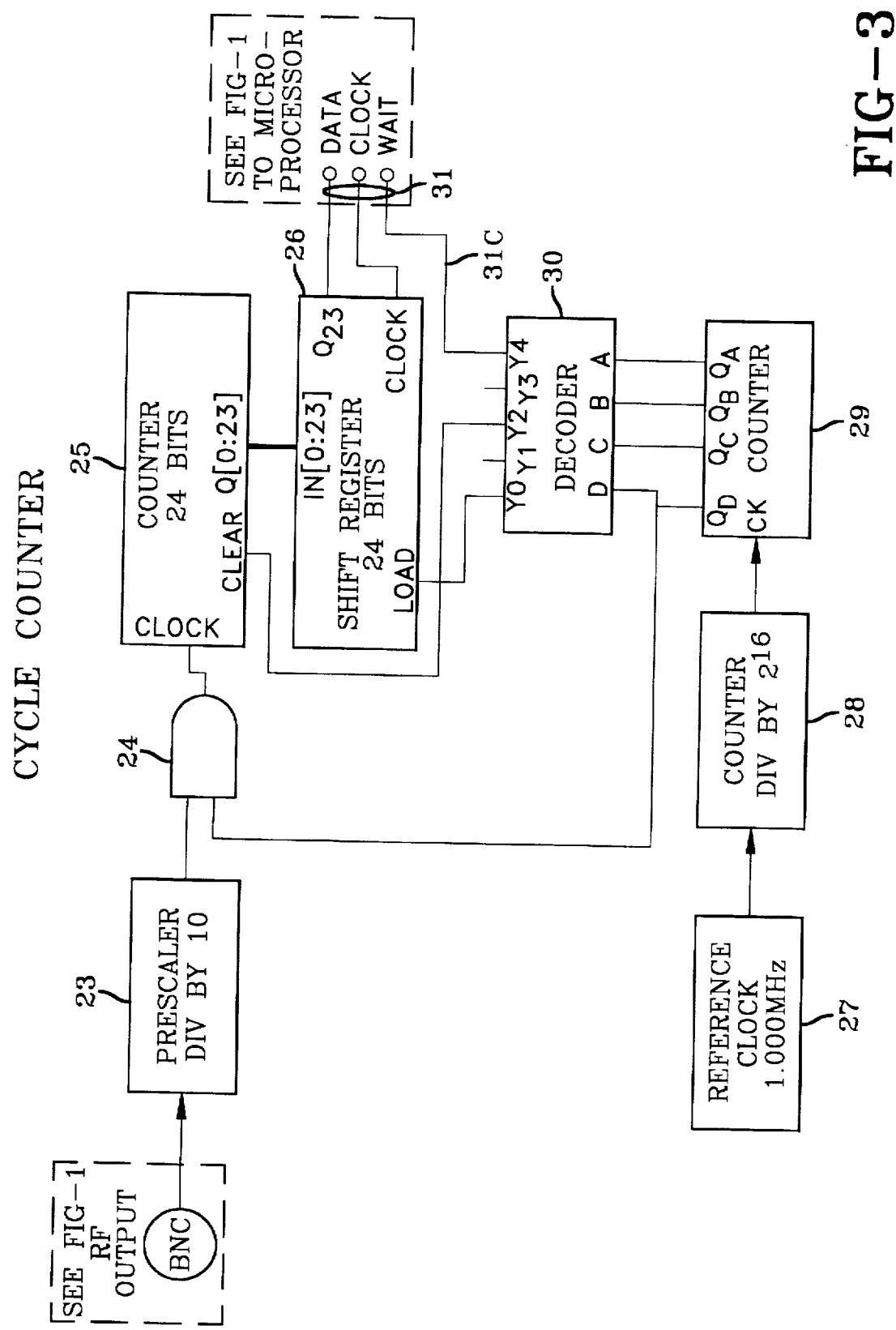
FIG. 3 is a cycle counter used to measure the deviation of the tones generated by the VHF/FM calibration tone generator.

The object of the deviation corrector shown in FIG. 3 is to correct for the distortion and amplitude error attributable to the nonlinear behavior of diode's capacitance resulting from an applied reverse bias dc voltage to a Voltage Variable Capacitance diode (VVC diode) as used in a VHF FM transmitter. This correction technique, when used in conjunction with a digital waveform source, can easily correct for non-linearity, as well as temperature, aging, and bias drifts of nonlinearity in the VVC diode performance. This technique allows large signal modulation with distortion reduced to −50 dBc and deviation accurate to ±0.05 dB using only an 8 bit waveform source.

The system of the present invention uses the microprocessor 1 and a digital counter circuit of FIG. 3 to measure the performance of the VVC diode in the actual environment (temperature, and component aging) and uses this information to allow the digital waveform source to produce an accurate FM modulated carrier in both deviation and distortion. By counting the cycles of the R.F. frequency shift generated by a DC voltage applied to the Varactor Diode, the profile of the transmitting system is determined and thus an accuracy of ±0.05 dB of deviation is maintained, indifferent of component aging, and temperature.

The "cycle counting" logic is illustrated in FIG. 3. The output of the transmitter, that is, the output of the RF modulator 7 of FIG. 1 is connected to a divide by 10 prescaler (23). This reduces the counting frequency from 167.5 MHz to 16.75 MHz allowing the logic to be created using the High Speed CMOS logic family. This divide by 10 carrier (16.75 MHz) is gated into a 24 bit counter (25) by an NAND gate (24). This allows the counting to stop while the resultant measurement is transferred from counter (25) to the shift register (26) and serially sent to the microprocessor 1 for further evaluation. The timing sequence is generated by the reference clock (27) and divided down to 15.26 Hz by counter (28). This divided down clock is feed into the counter (29)/decoder (30) to generate the timing sequence as follows: During the first 0.524288 second, the counter (25) is enabled via the nand gate (24) and the carrier cycles are counted; for the remainder of the sequence, the counting is inhibited. A 65.5 ms duration of wait is followed by a 65.5 ms pulse so as to send the data from the counter 25 to the shift register (26) followed by a 65.5 ms duration of wait followed by a pulse of 65.5 ms so as to clear the counter (25). For 65.5 ms, the wait line (31c) goes low alerting the microprocessor 1 that the data is ready. The microprocessor 1 now clocks the data as it is read from the shift register (26) during this period. Using the selected timing sequence described above in conjunction with the cycle difference calculation in firmware, the measured deviation error is ±0.026 dB worst case at 10 KHz deviation with a ±1.5 count error in counter (25) due to potential propagation delays in NAND gate (24). By calculating the difference between two cycle counting data points, the accuracy of the reference clock (27) is relaxed to 100 ppm. The cycle counting firmware procedure is described by the flow chart in FIG. 4 comprised of program segments. The D/A 4 is prepared for the desired cycle counting by having gain 1 (G1) and gain 0 (G0) of FIG. 1 configured to the appropriate settings shown in program segment 32. The appropriate anti-distorted waveform is copied into buffer 1 array as shown in program segment 33. The amplitude scale factor is set to 255 and will be called the variable "C" as shown in program segment 34.

Buffer 2 array is the unsigned integer multiplication of the buffer 1 elements times "C" divided by 256 as shown in program segment 35. Buffer 2 now contains the amplitude scaled waveform. The positive peak (see program segment 36) of this waveform is sent to the D/A (4) of FIG. 1 which happens to be the 1st element in buffer 2. A four second delay is used to allow for an appropriate settling time and the measurement of cycle count to be completed. The count cycle procedure of program segment 46 also shown in program segment 37 waits for the "wait" signal (31c) to go low then the data is clocked from the shift register (26) to the microprocessor as described and more fully completely illustrated for program segment 46 is stored in variable "count1" of program segment 37.

The D/A (4) is now set to the negative peak (see program segment 38) of the waveform, buffer 2, which happens to be the 129th element of program segment 38. After a four second delay the count cycle procedure (46) is called for by program segment 39 with the result stored in variable "count2".

The D/A (4) is now set to the midband point (0V) of the waveform in buffer 2 which happens to be the 65 element of program segment 38. After a four second delay the count cycle procedure (46) is again called program segment 39 with the result stored in variable "count0".

Figure 4A:
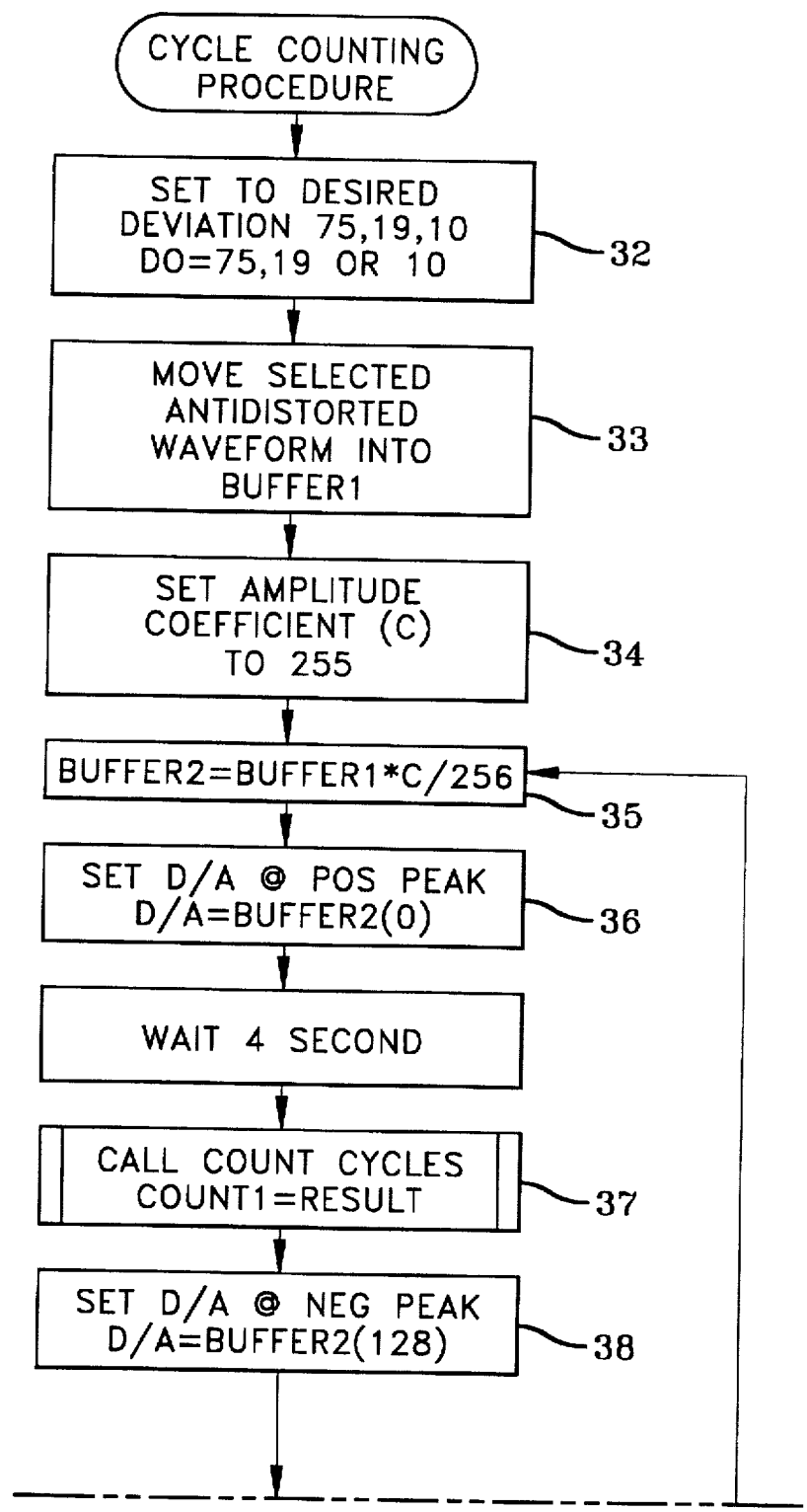
FIG. 4 is the cycle counting and deviation measurement firmware of the VHF/FM calibration tone generator.
Figure 4B:
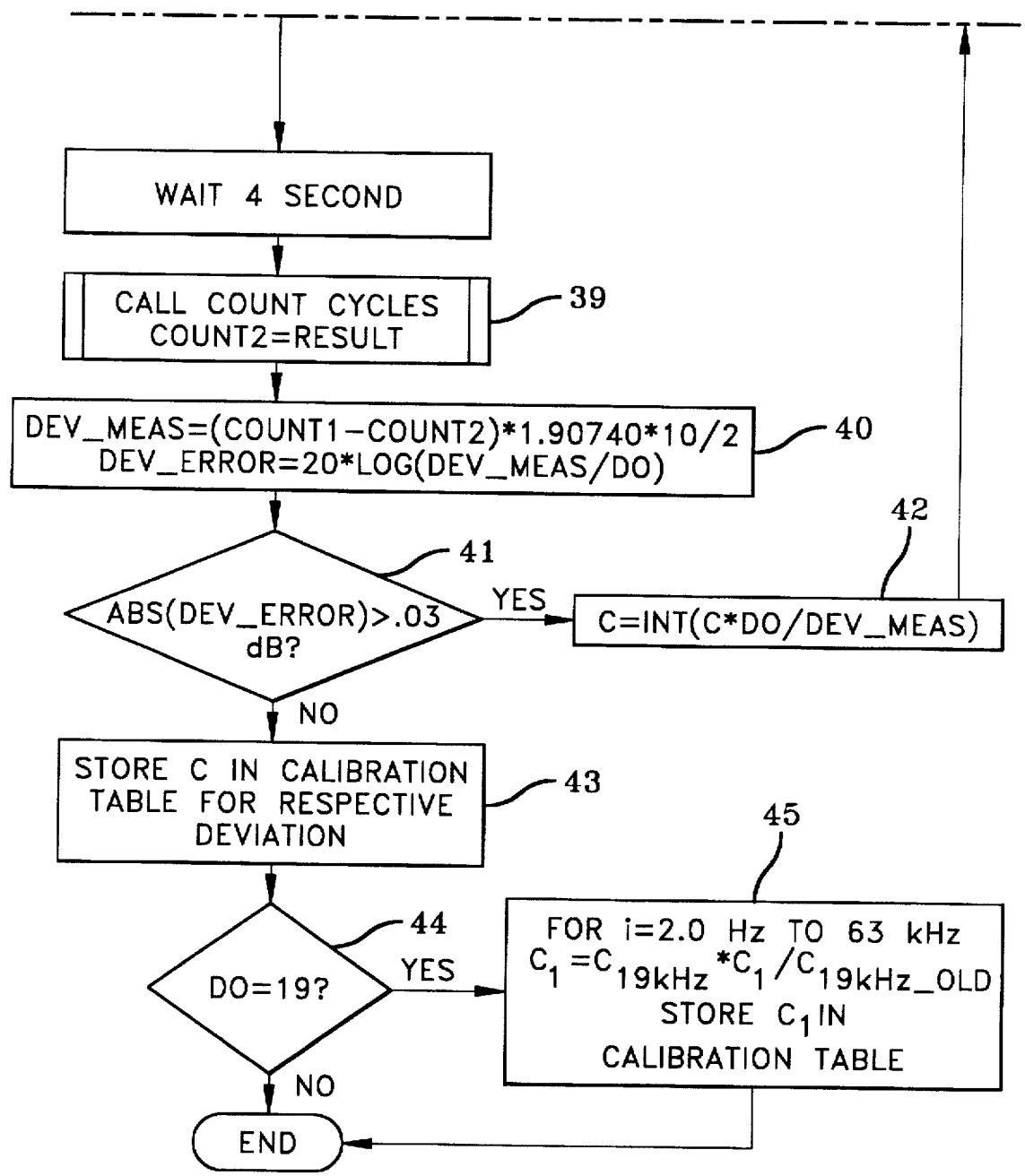
Figure 4C:
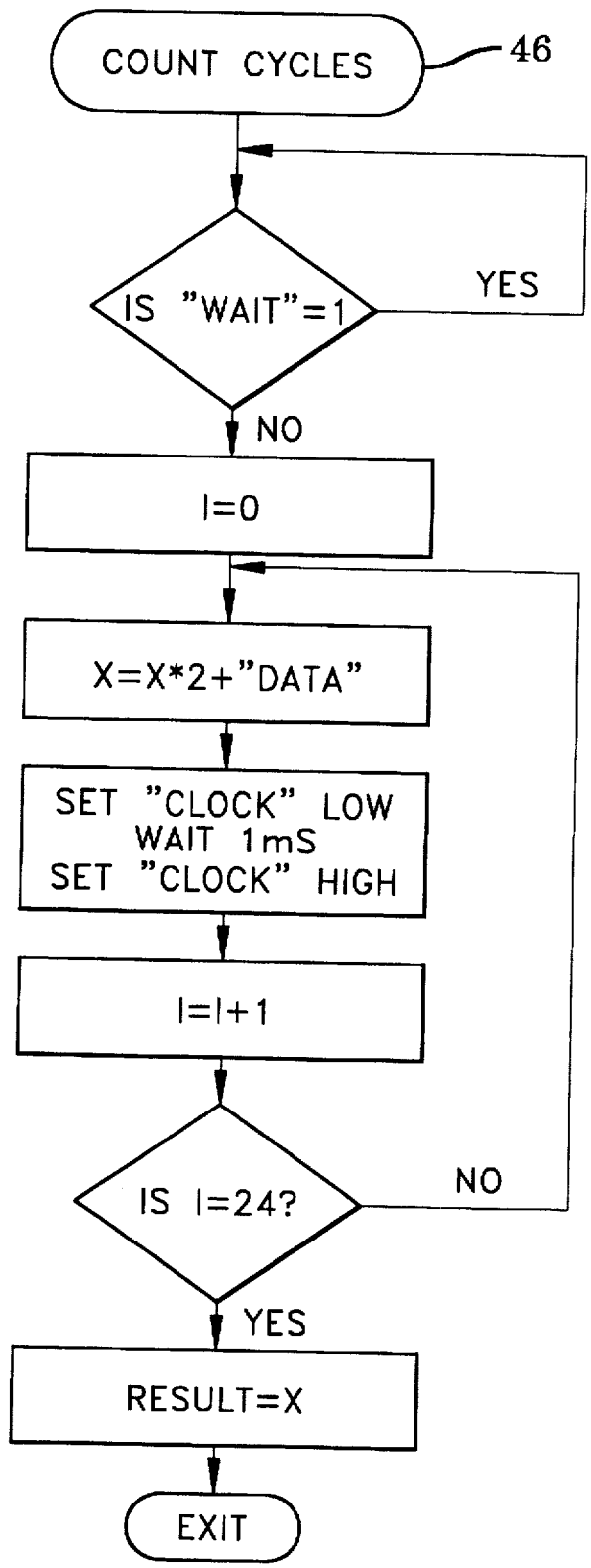

The measured deviation is calculated in program segment 40 from the formula <deviation measured>equals=(count1−count2)*1.90740*5 for peak deviation. The error between the desired and measured deviation is calculated (<dev_ error>=20*log (<measured deviation>/<desired deviation> where the desired deviation is 75000, 19000, or 10000). If the measured dev_error is greater than 0.03 dB (see program segment 41) the amplitude coefficient (variable C) is set to the integer result of the following formula of program segment 42: <current amplitude coefficient>*<desired deviation>/<measured deviation> and the above process is repeated until the measured deviation error starting with the program segment 35 is less than 0.03 dB as shown in FIG. 4 with follow-on operations being accomplished by program segments 43, 44 and 45.

Figure 5A:
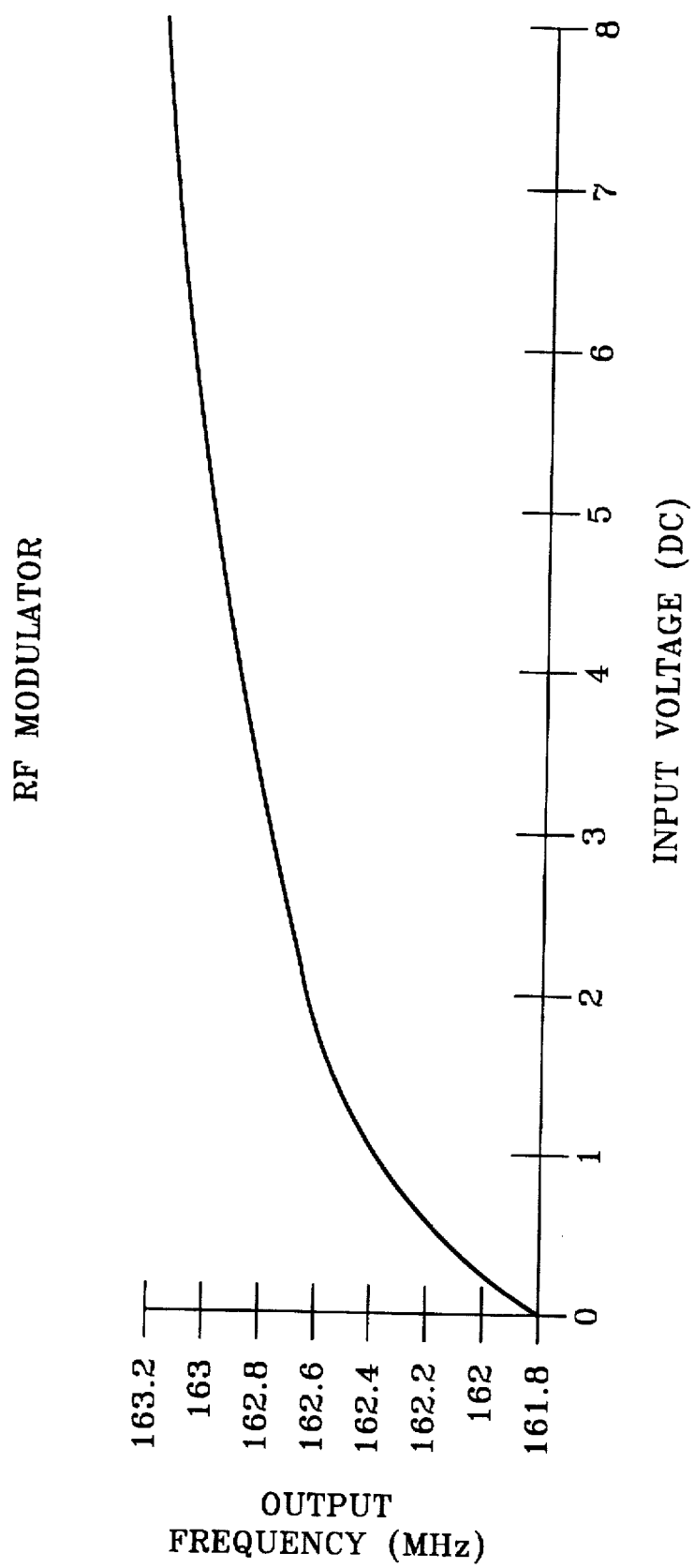
FIGS. 5A–5C show the transmitter performance and the effects of the antidistortion correction.
Figure 5B:
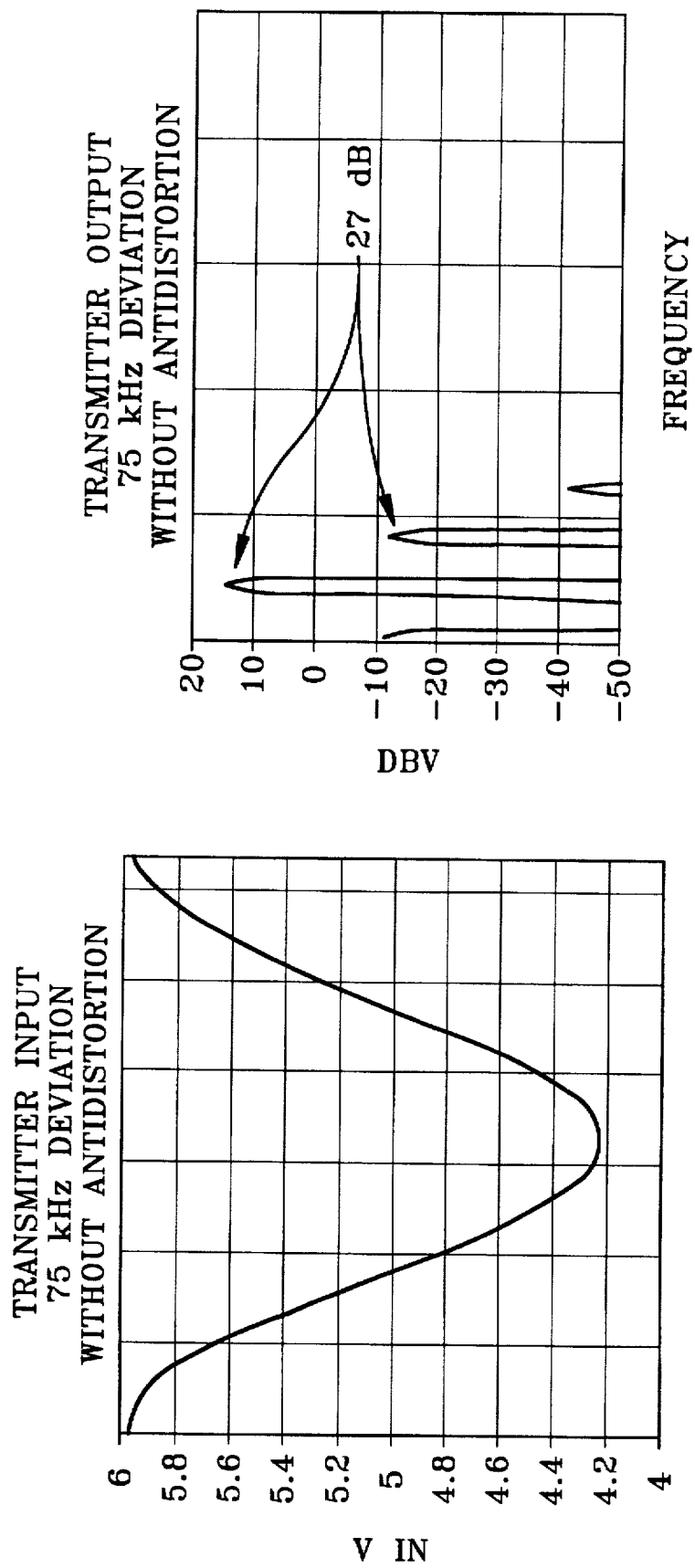
Figure 5C:
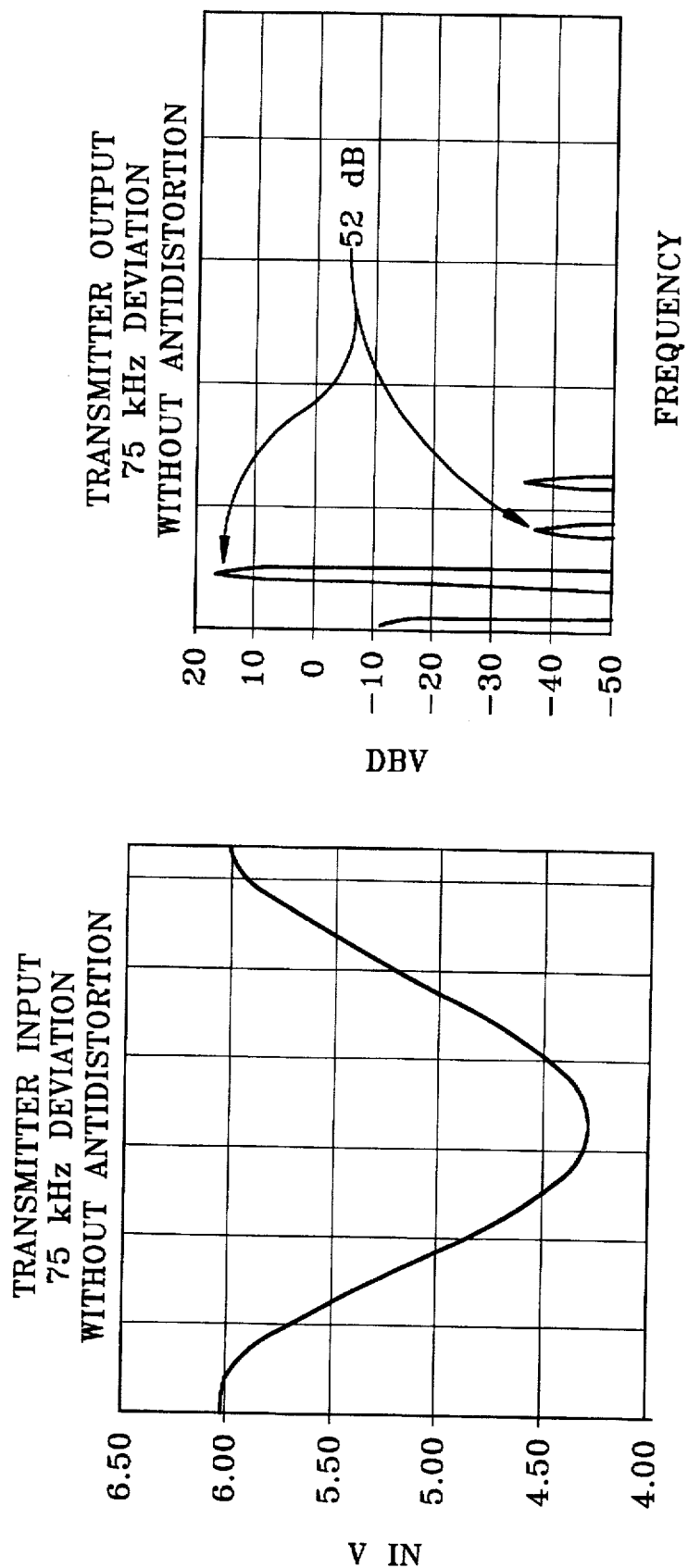

The transfer characteristics of a voltage variable capacitance diode (VVC diode) is nonlinear as displayed in the plot of carrier frequency versus VVC diode input as shown in FIG. 5A. By using a large signal excursion for 75 KHZ deviation (see FIG. 5B), large 2nd harmonic distortion is imminent (−27 dBc) also as shown in FIG. 5B. FIG. 5B, as well as FIG. 5C, is segmented into two halves with the left half illustrating the parameters of the transmitter's 7 input and the right half illustrating the parameters of the transmitter's 7 output. This level of −27 dBc of FIG. 5B is unacceptable and an anti-distortion procedure is needed to reduce this level and is accomplished by the practice of the present invention. More particularly, when a −27 dBc 2nd harmonic distortion is combined out of phase with the fundamental and stored in the sine wave lookup table, the resultant 2nd harmonic distortion is reduce to an acceptable −52 dBc as shown in FIG. 5C. By taking the derivative of the plot of FIG. 5A, it can be seen the gain is also a function of the dc bias of the VVC diode and thus and drift of 0.1V would result in a gain error of 0.16 dB. This effect is corrected by using the "cycle counting procedure" of FIG. 4.

By using a third point, the mid voltage (0 V) of the desired modulated signal, the amount of VVC diode's distortion is determined. This is predominately 2nd harmonic and during the following calculation it will be assumed to be all 2nd harmonic distortion resulting with a sine waveform generated with less than −50 dBc. A variable will be called "A" and set to the following formula $$A=(COUNT0-(COUNT1+COUNT2)/2)/(COUNT1-COUNT2)$$

I.E.: $D=(COUNT1-COUNT2)/2:D4=(COUNT1-COUNT0):D5=(COUNT0-COUNT2):A=(D-D4)/(D*2)$: Buffer1 is set to the following formula Buffer1[i]=INT( (COS(i/256*6.283)+A*cos(i/256*2*6.2830))/(1+A)*127+ 128). The cycle counting procedure for deviation is repeated to correct for the change in deviation caused by the removal of the 2nd harmonic component.

SYSTEM FIRMWARE

Figure 6A:
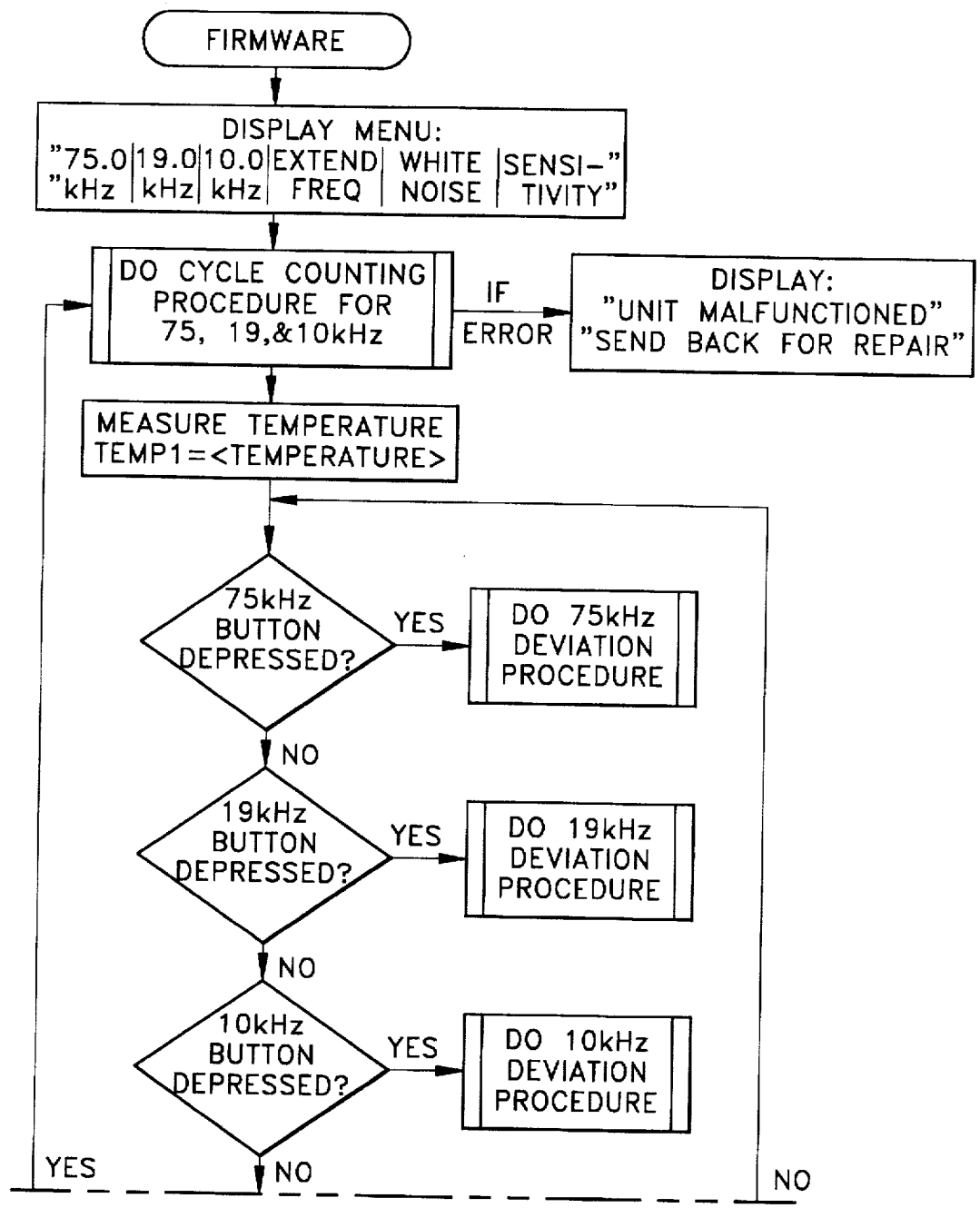
FIGS. 6–15 are the flow charts for the system firmware.
Figure 6B:
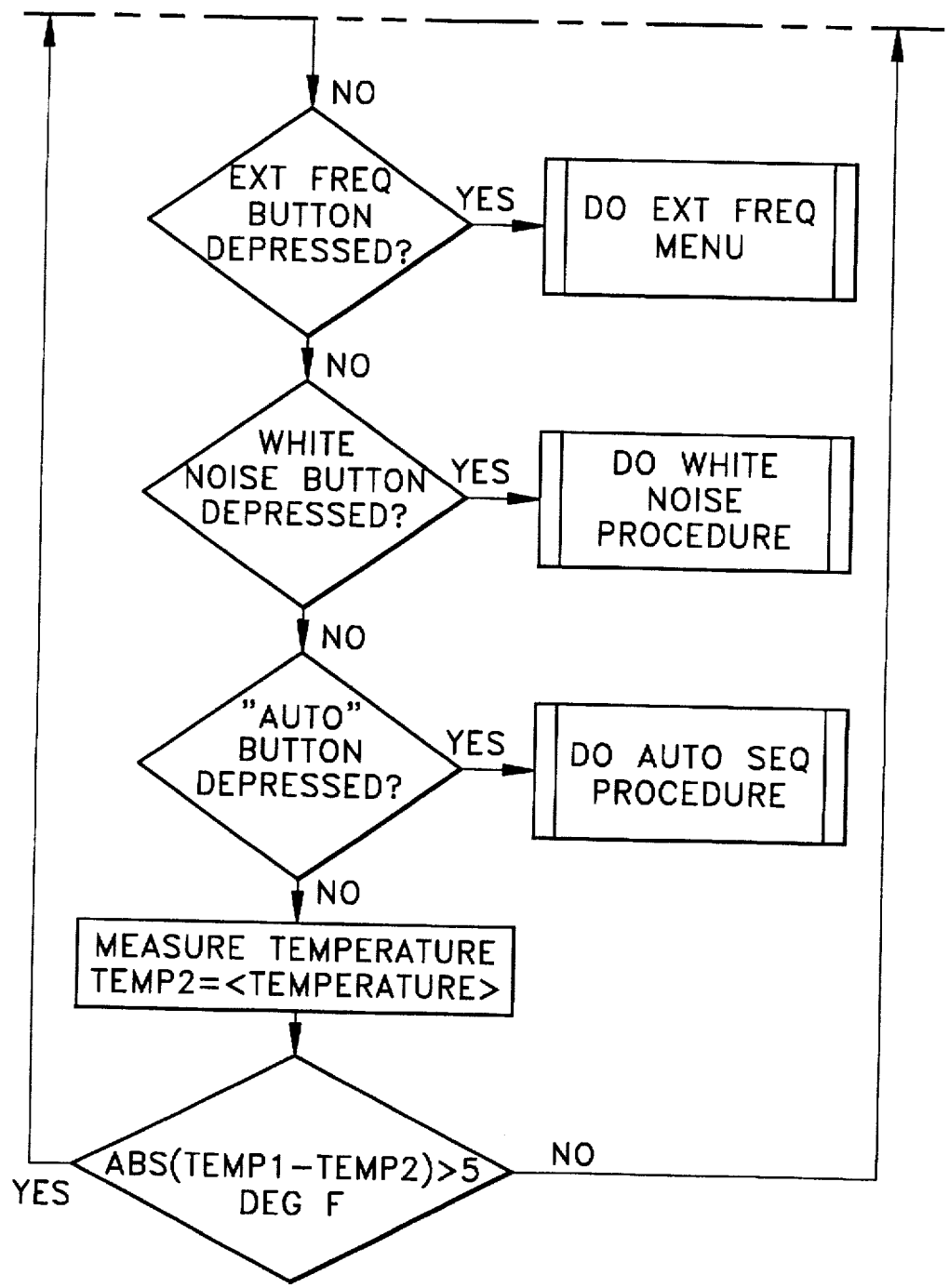

The firmware used for the preferred embodiment is described by the following flow charts in FIGS. 6 to 15. When the system is first powered, the main menu is executed as shown in FIG. 6. The cycle counting procedure illustrated in FIG. 6 is executed, and if an error occurred (count=0 or count<7,000,000 or count>9,000,000) an error message is displayed and the system halts from further use. Otherwise, the temperature is measured and recorded and the microprocessor 1 scans each switch. If any switch is depressed the selected routine is executed otherwise the temperature is remeasured. If the temperature changed more than 5° F., the cycle counting routine is repeated.

Figure 7:
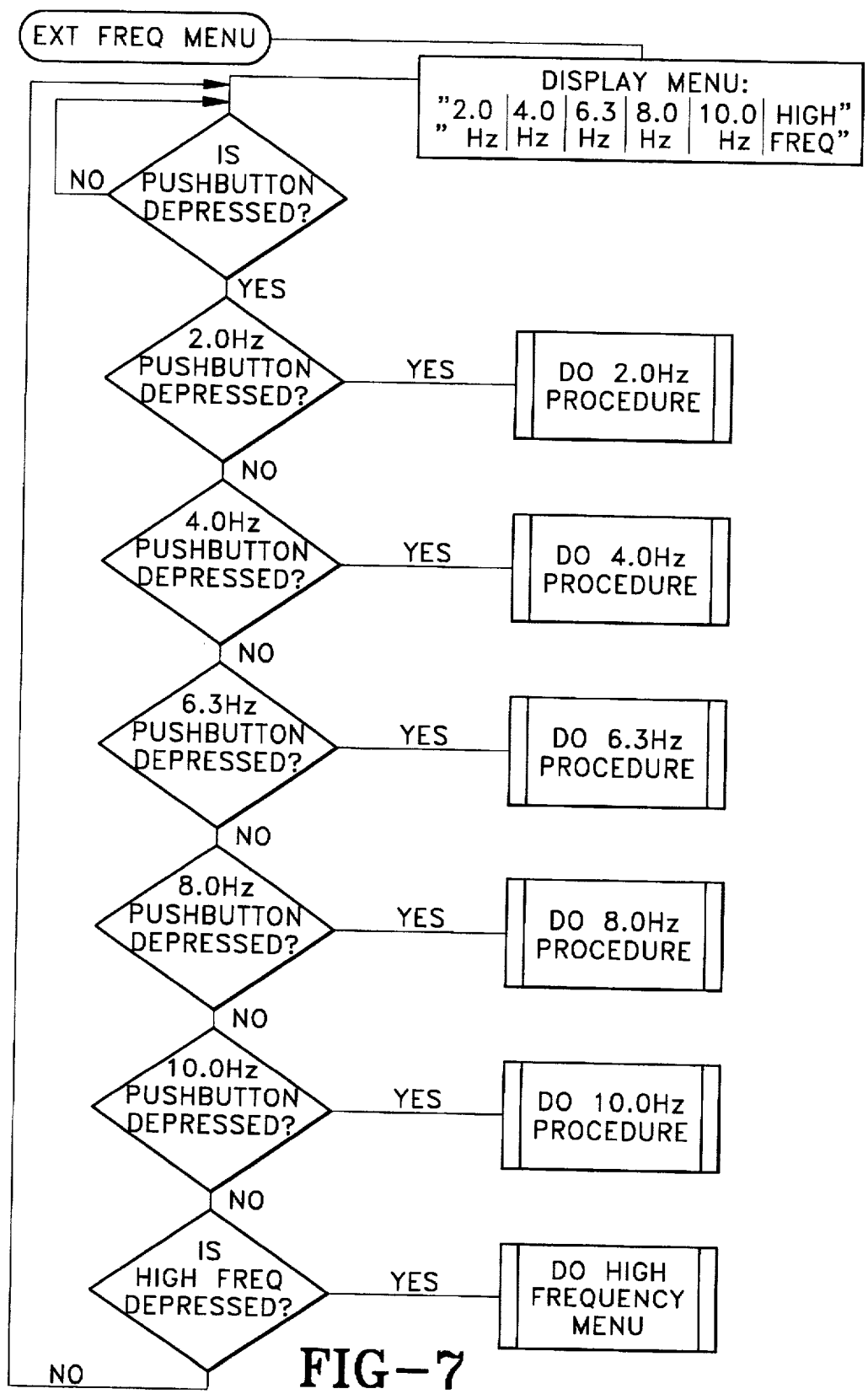
Figure 8A:
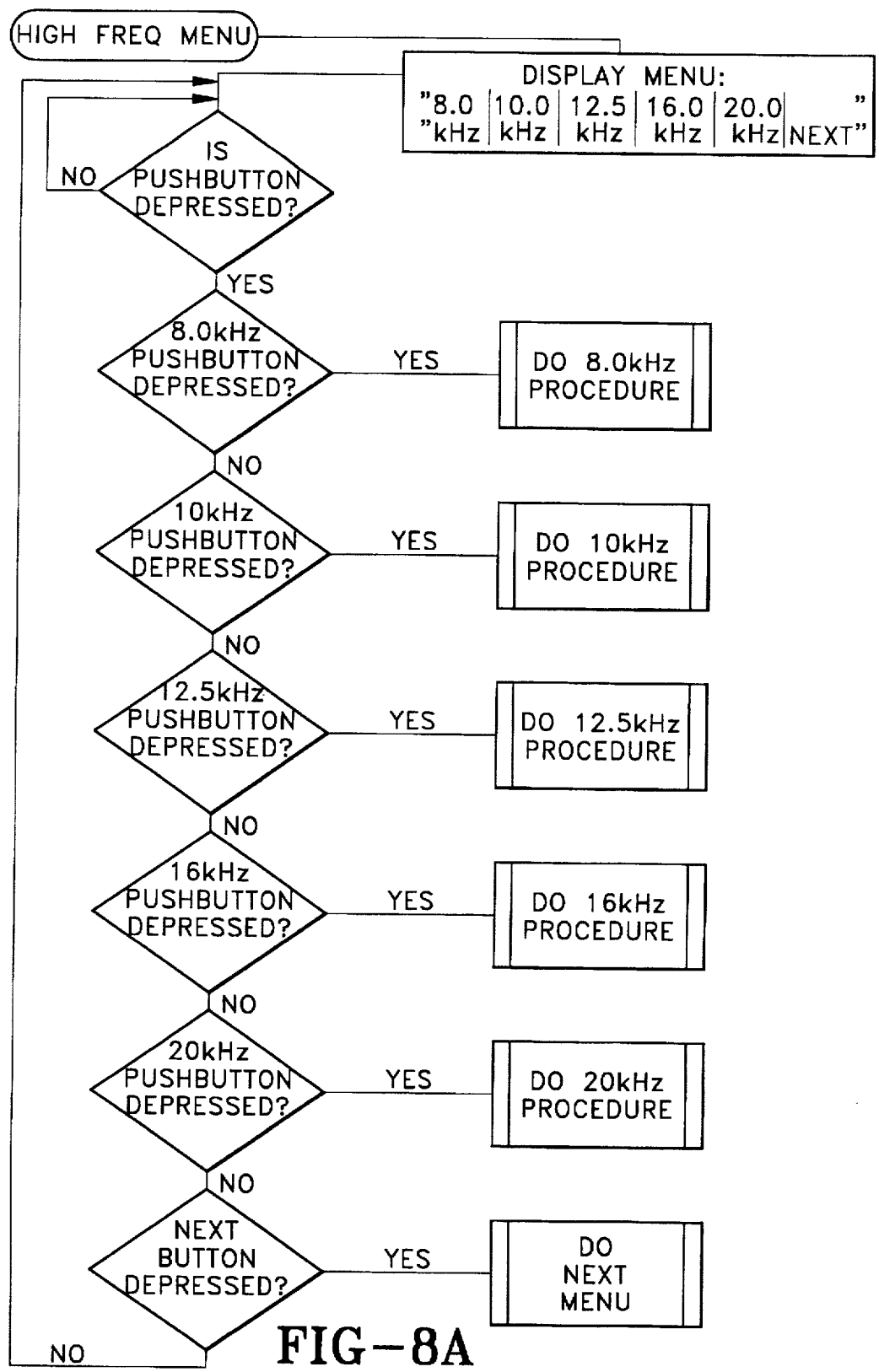
Figure 8B:
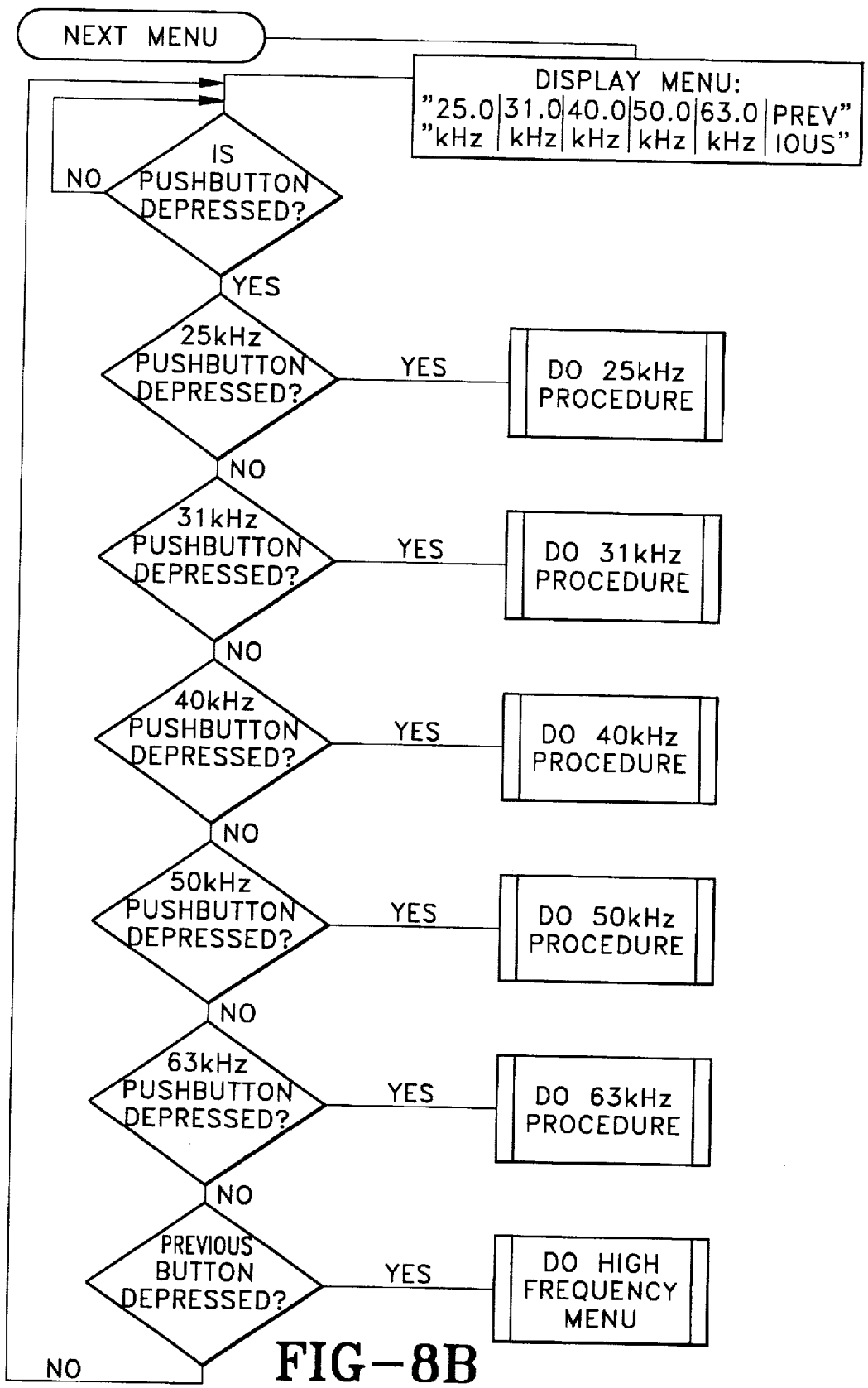

If the extended frequency menu was selected, the menu changes as illustrated in FIG. 7 with a new set of soft-menu labels. If any buttons generally illustrated in FIG. 7 is depressed, the respective routine would be executed. IF the High Frequency button is depressed, the menu shown in FIG. 8A is displayed with the appropriate routine being executed, if any generally illustrated button is pressed. If the next button is pressed, the last set of soft buttons shown in FIG. 8B is selected. If any button is depressed, the appropriate routine is executed. During any soft menu of FIG. 7, depressing "main menu" button causes the escape to the default power on menu which is included in the Display Menu shown in FIG. 6.

Figure 9C:
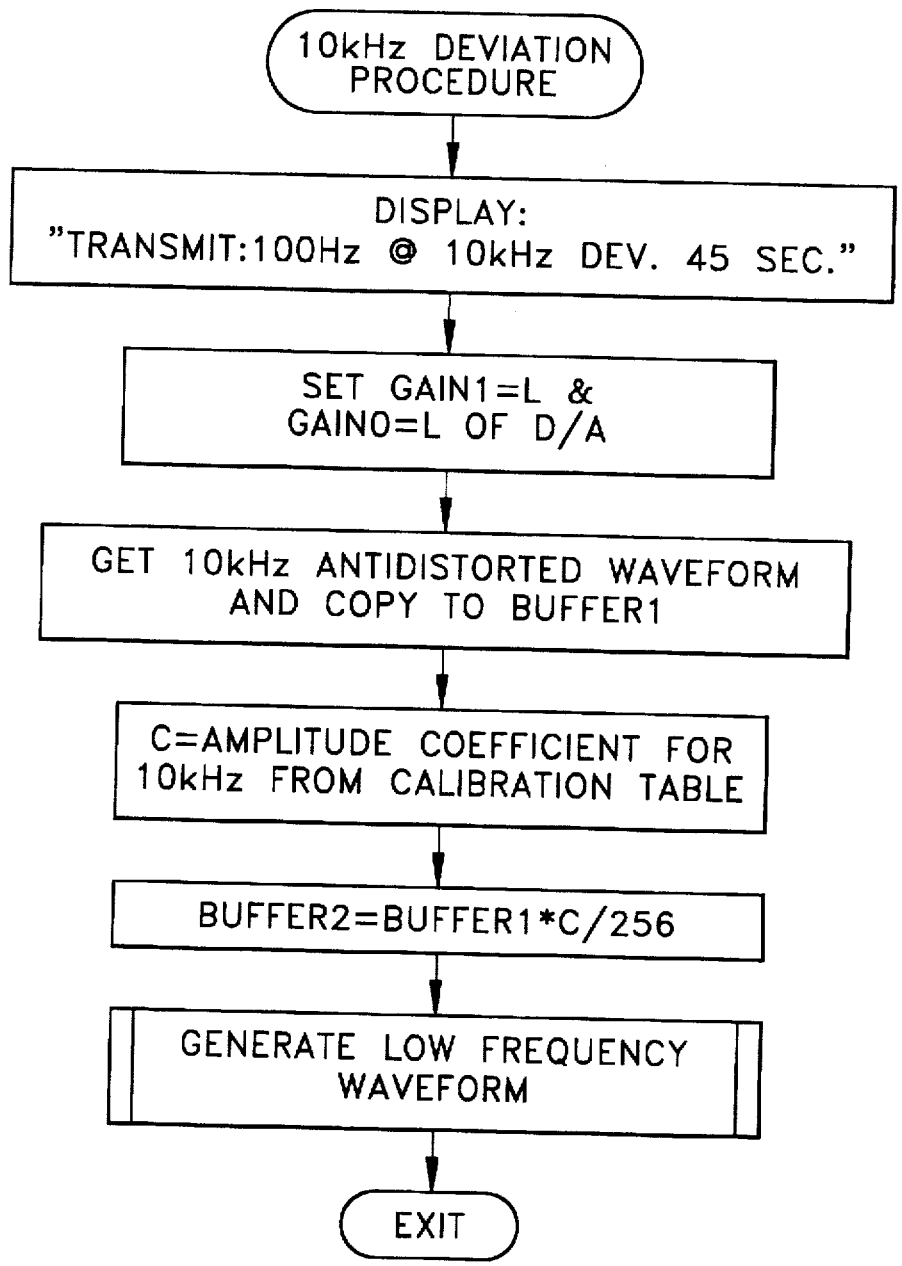

FIGS. 9A–D show the firmware required to generate 75 kHz, 19 kHz and 10 kHz at 100 Hz modulation frequency and are illustrated in FIGS. 9A, 9B, and 9C respectively. All three FIGURES are similar in nature and FIG. 9B will be explained with the reference to FIG. 9B. Upon depressing the 19 KHZ menu button, "Transmit: 100 Hz @ 19 kHz DEV. 45 Sec" is displayed on the LCD display. Gain1 of the D/A (4) is set low and Gain0 is set high. The 19 kHz anti-distortion waveform is copied into buffer1. The amplitude coefficient for 19 kHz deviation at 100 HZ is copied from the calibration table into a variable called "C". Buffer 2 is set to Buffer1*C/256. Register pair DE (not shown) is set to a number of waveform cycles (see FIG. 9D) (4500) to be generated. The buffer pointer I is set to 0.

The value of Buffer2 pointed by I is outputted to I/O port A. After 3 uS delay, a zero is outputted to port C, another 3 uS delay, then Port C is set to 128. The pointer I is incremented and and appropriate time delay established by no operations (NOPS) is executed and this operation starting with the value of Buffer 2 is repeated until the pointer I equals 256. When I equals 256, I is reset to zero, and the register pair DE (not shown) is decremented by one. This operation starting with the value of Buffer 2 is again repeated until DE equals zero where the subroutine is now complete and exits to the main menu of FIG. 6.

Their is a slight increase in time between samples 255 and 0 due to the decrement of register pair DE and testing of DE=0 (shown as D=0?) but due to the 256 samples per waveform, and a low waveform frequency (100 Hz) relative to microprocessor clock, the impact on the desired waveform is very minimal.

Figure 9D:
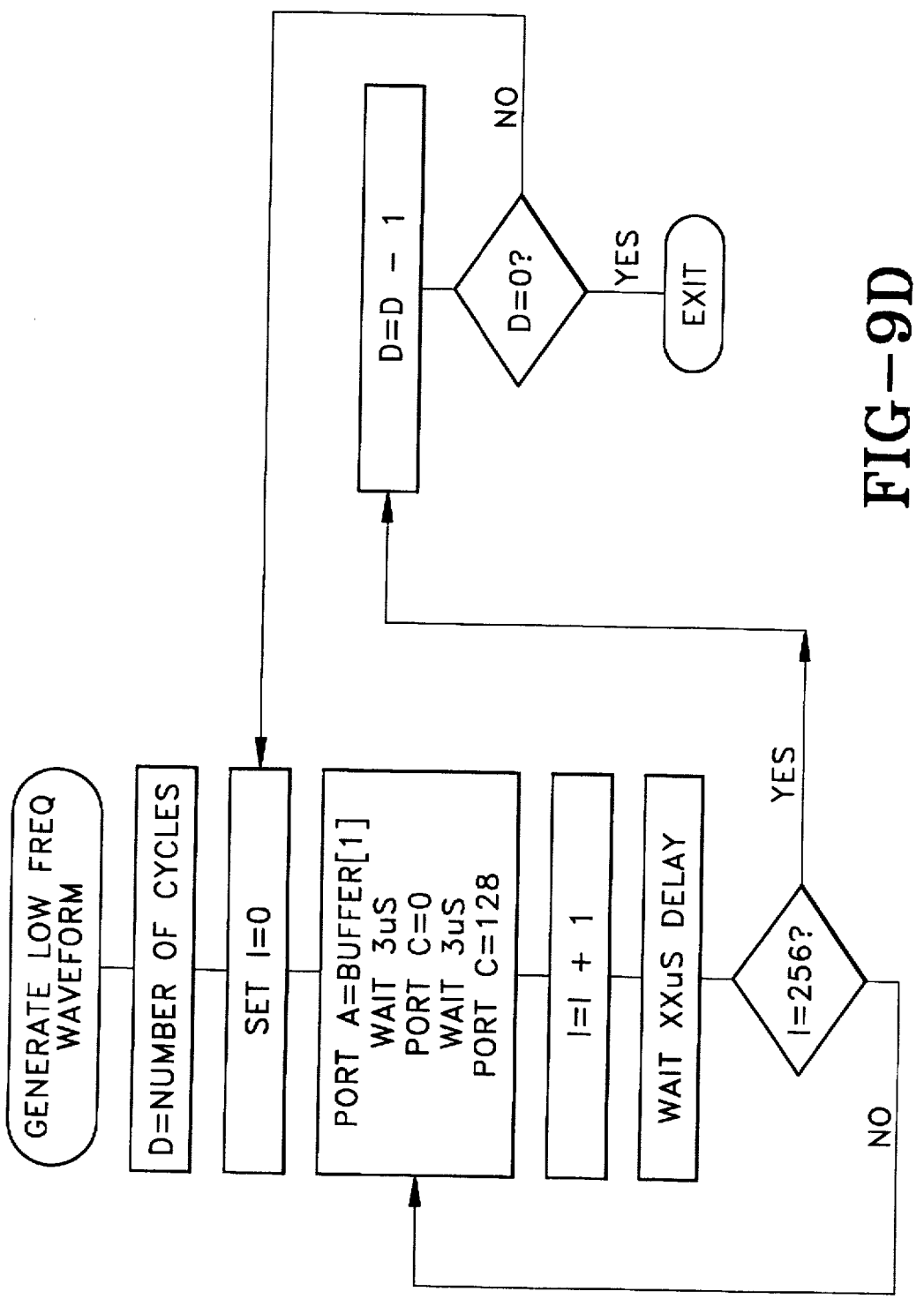
Figure 10A:
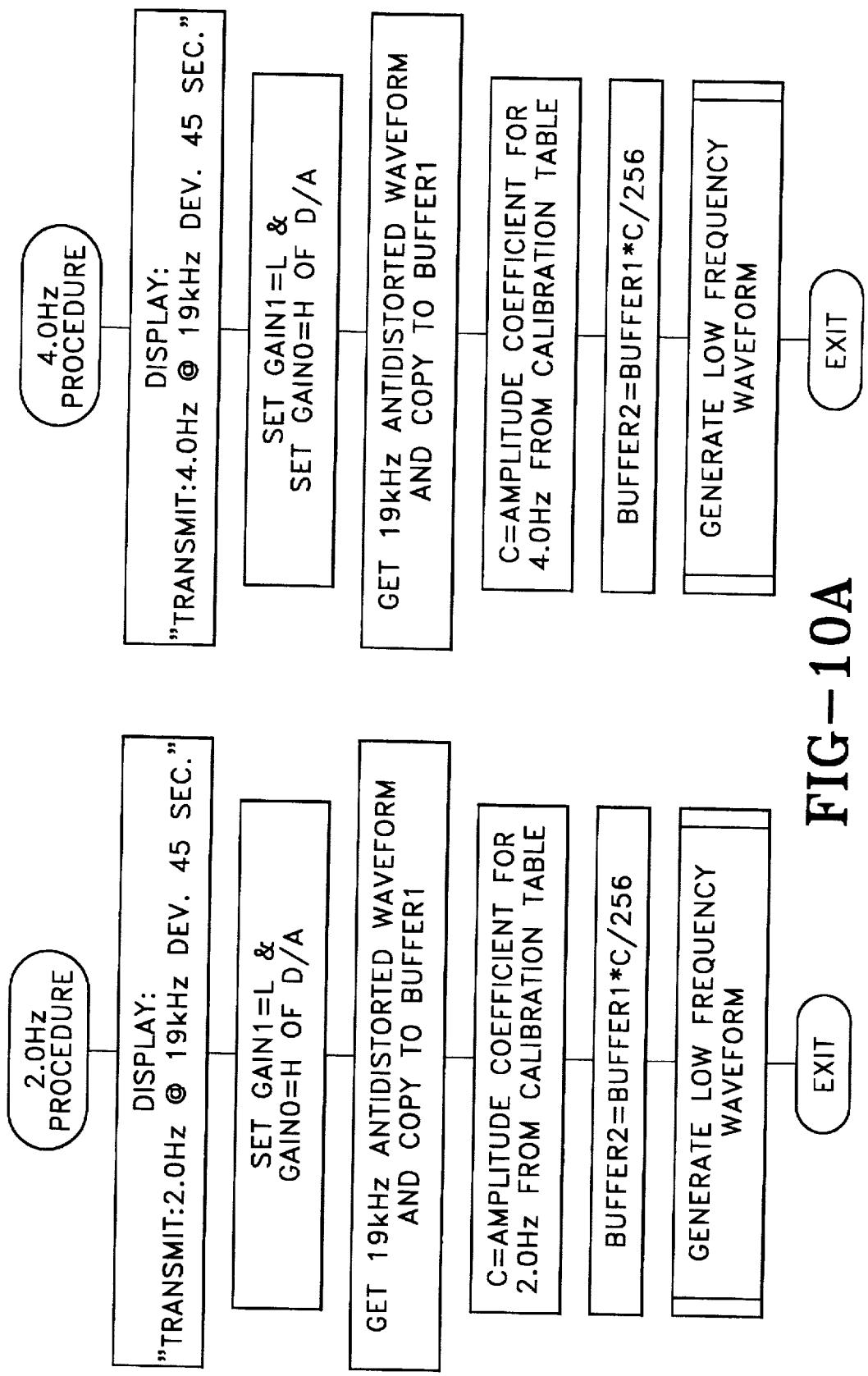
Figure 10B:
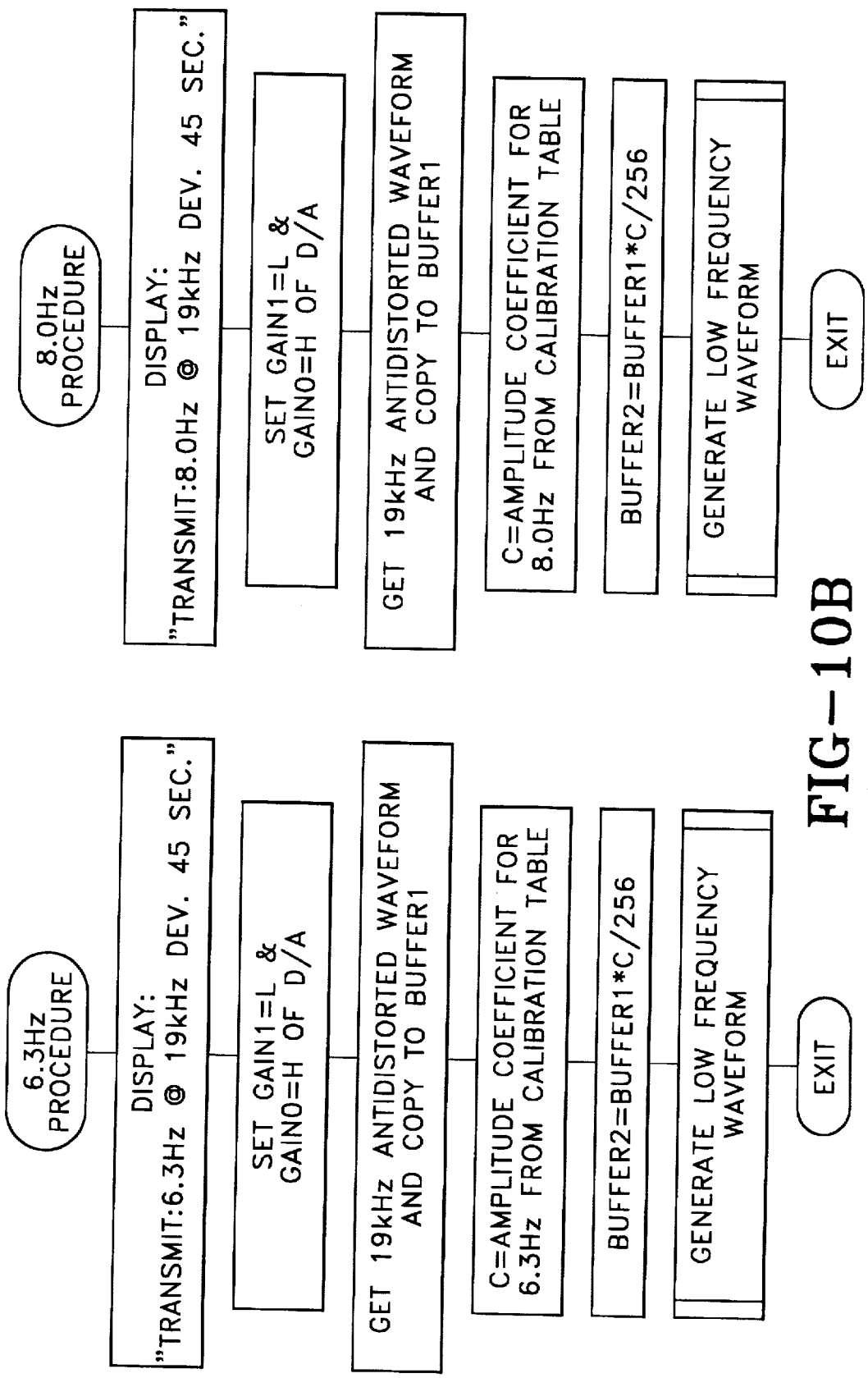
Figure 10C:
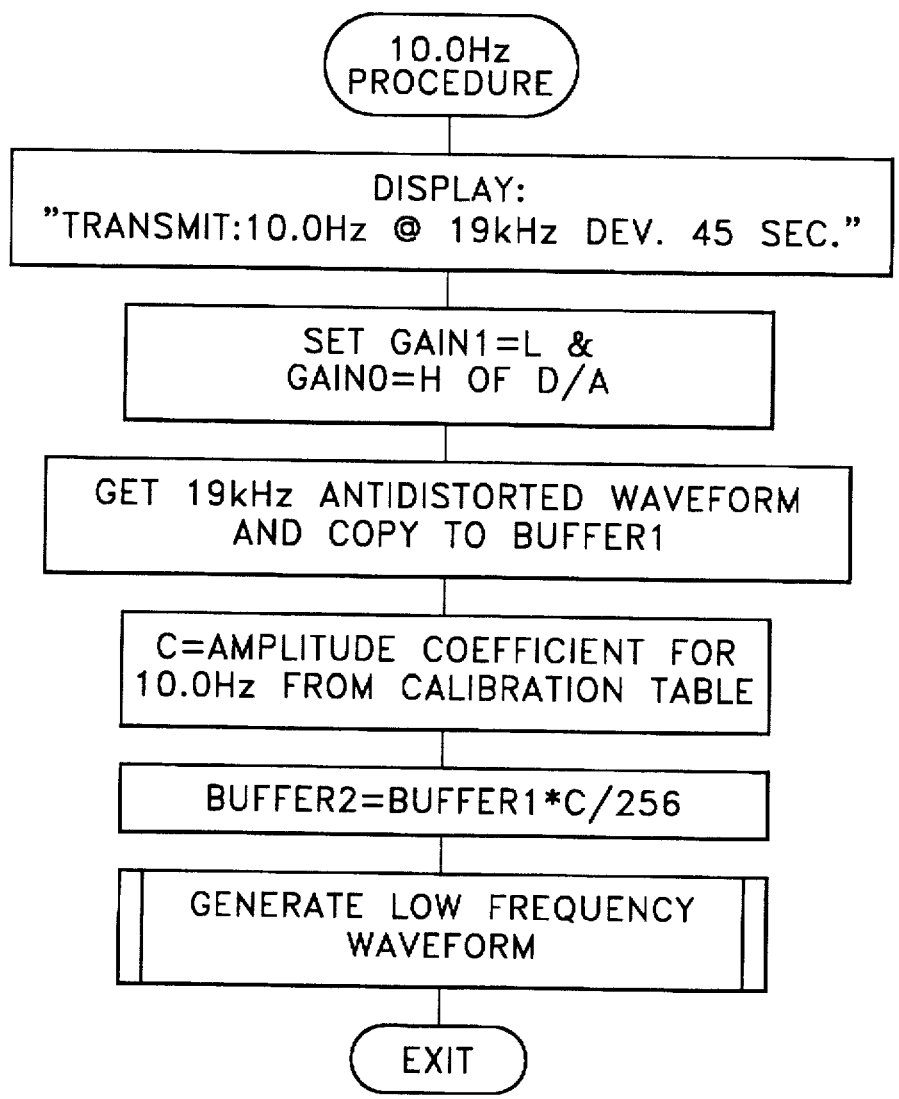

FIG. 10 shows the procedures for 2.0 Hz 4.0 Hz, 6.0 Hz, 8.0 Hz and 10.0 Hz and is similar to the above procedure described with reference to FIGS. 9B and 9D for the 19 kHz deviation at 100 Hz.

Figure 11A:
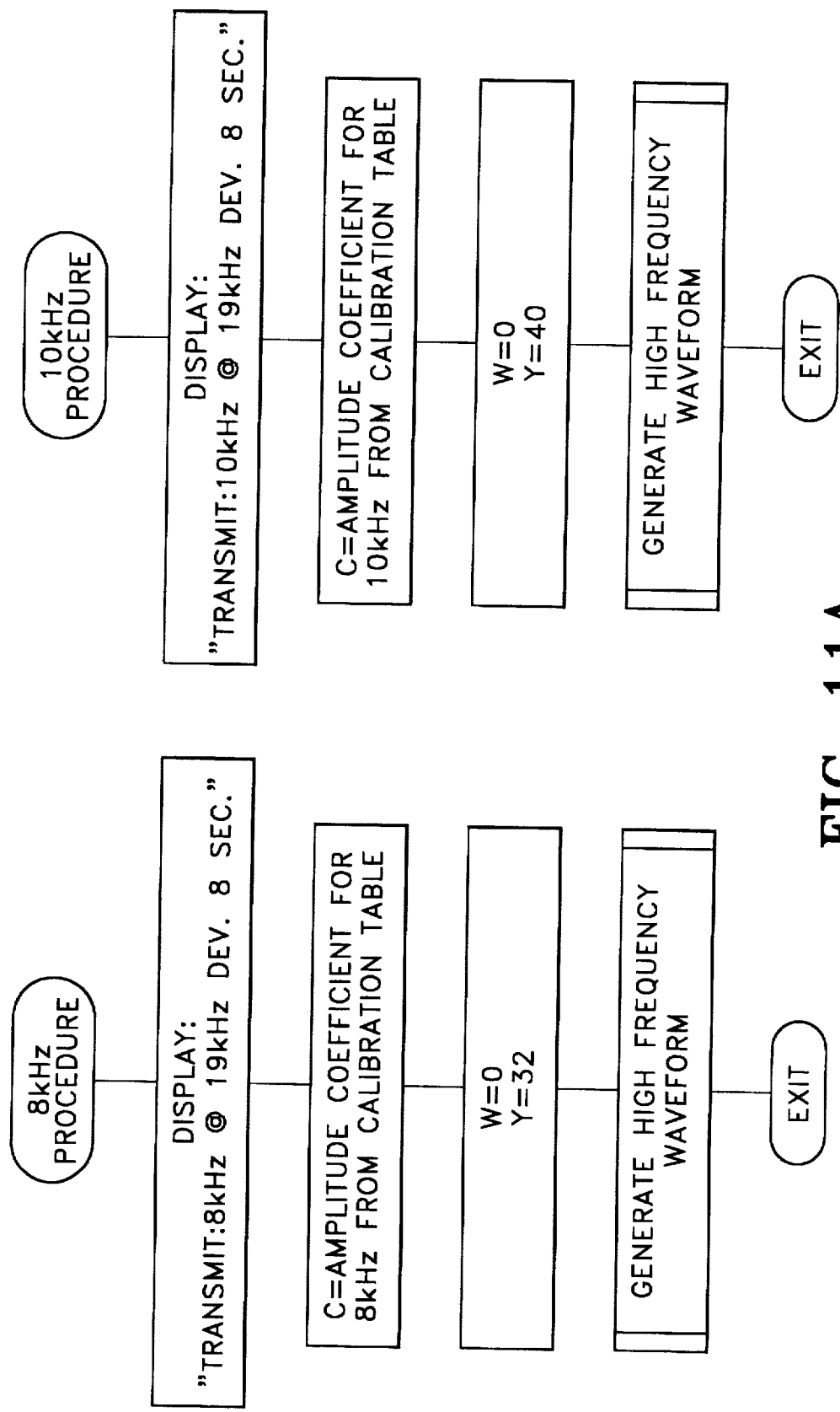
Figure 11B:
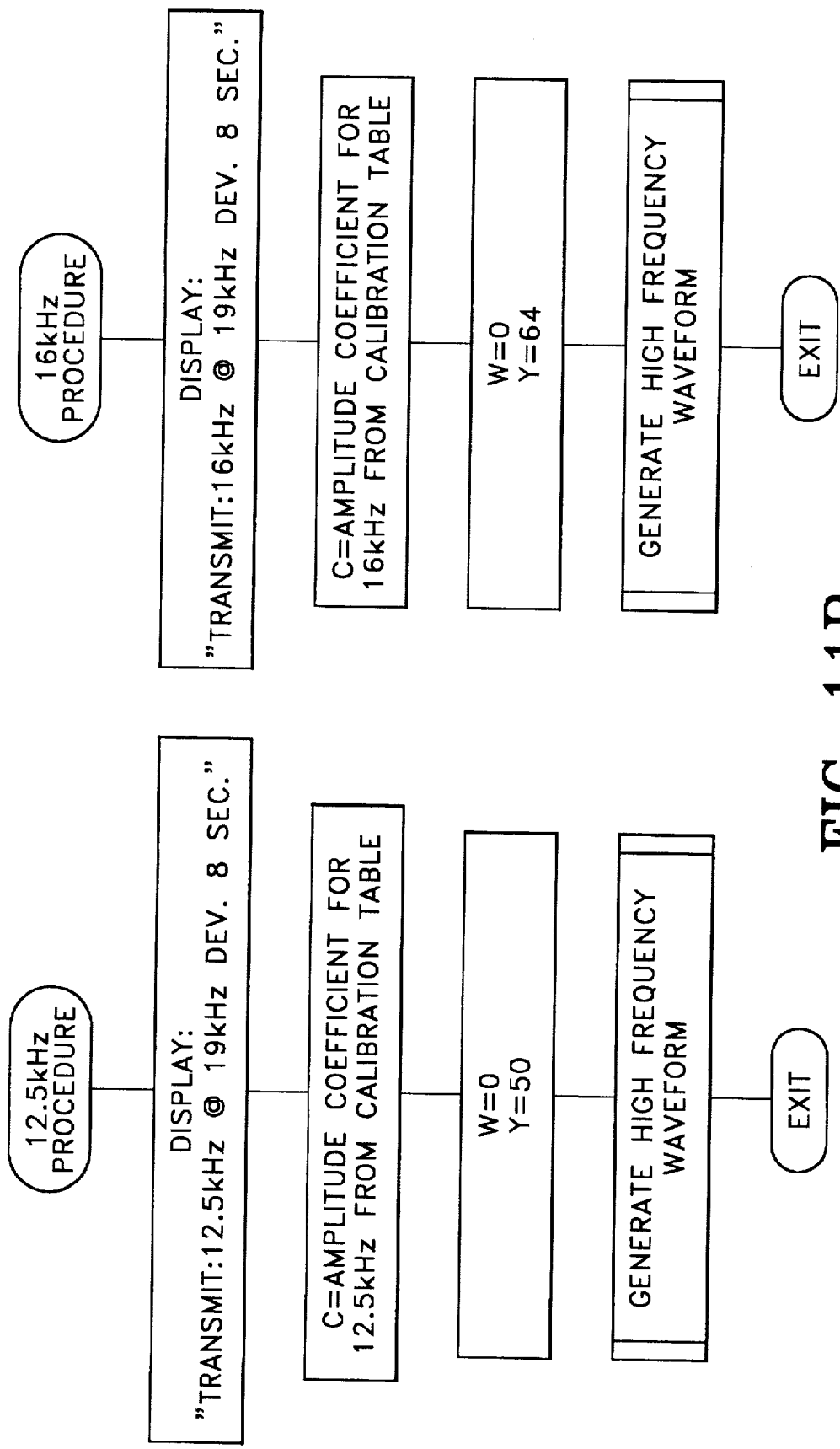
Figure 11C:
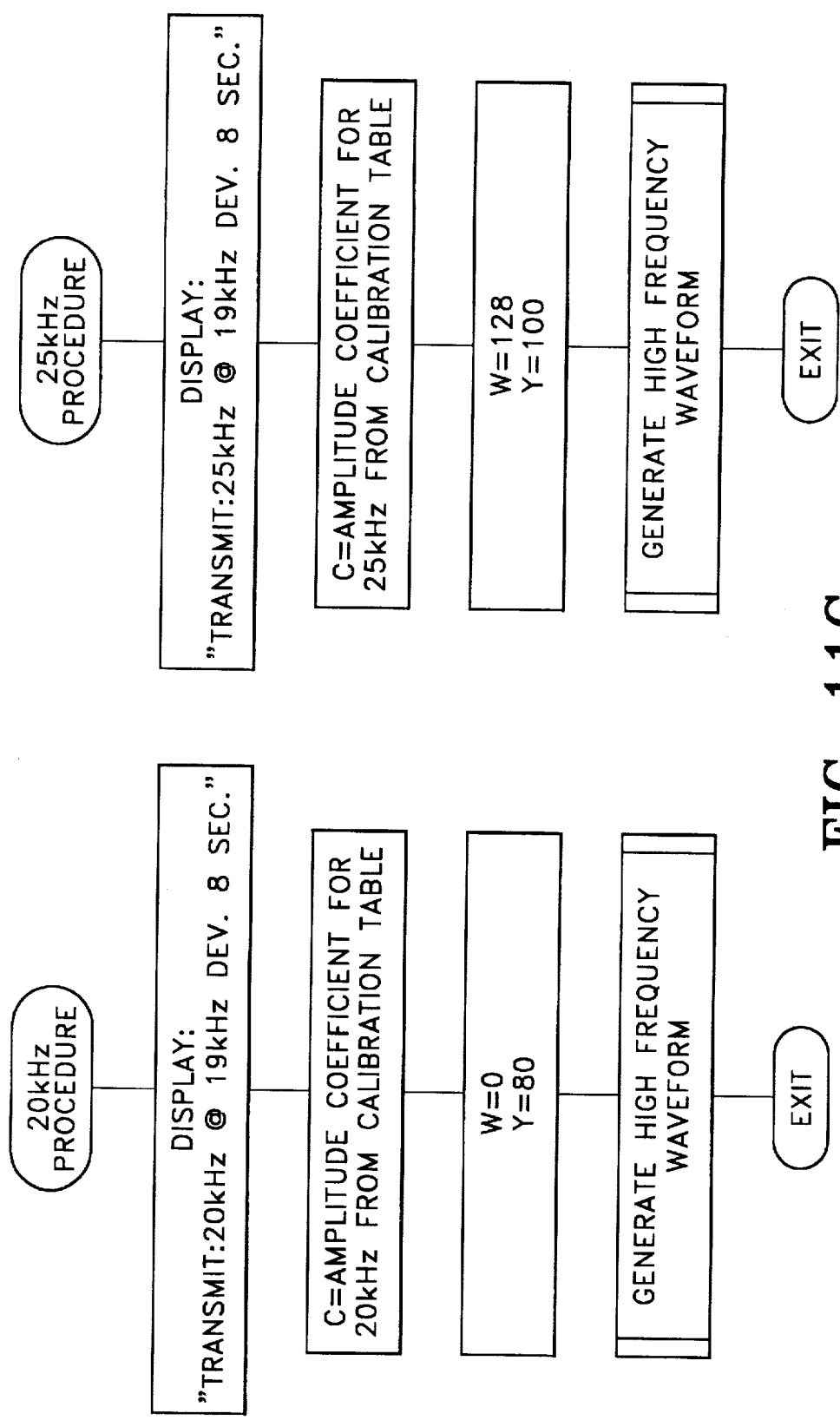
Figure 12A:
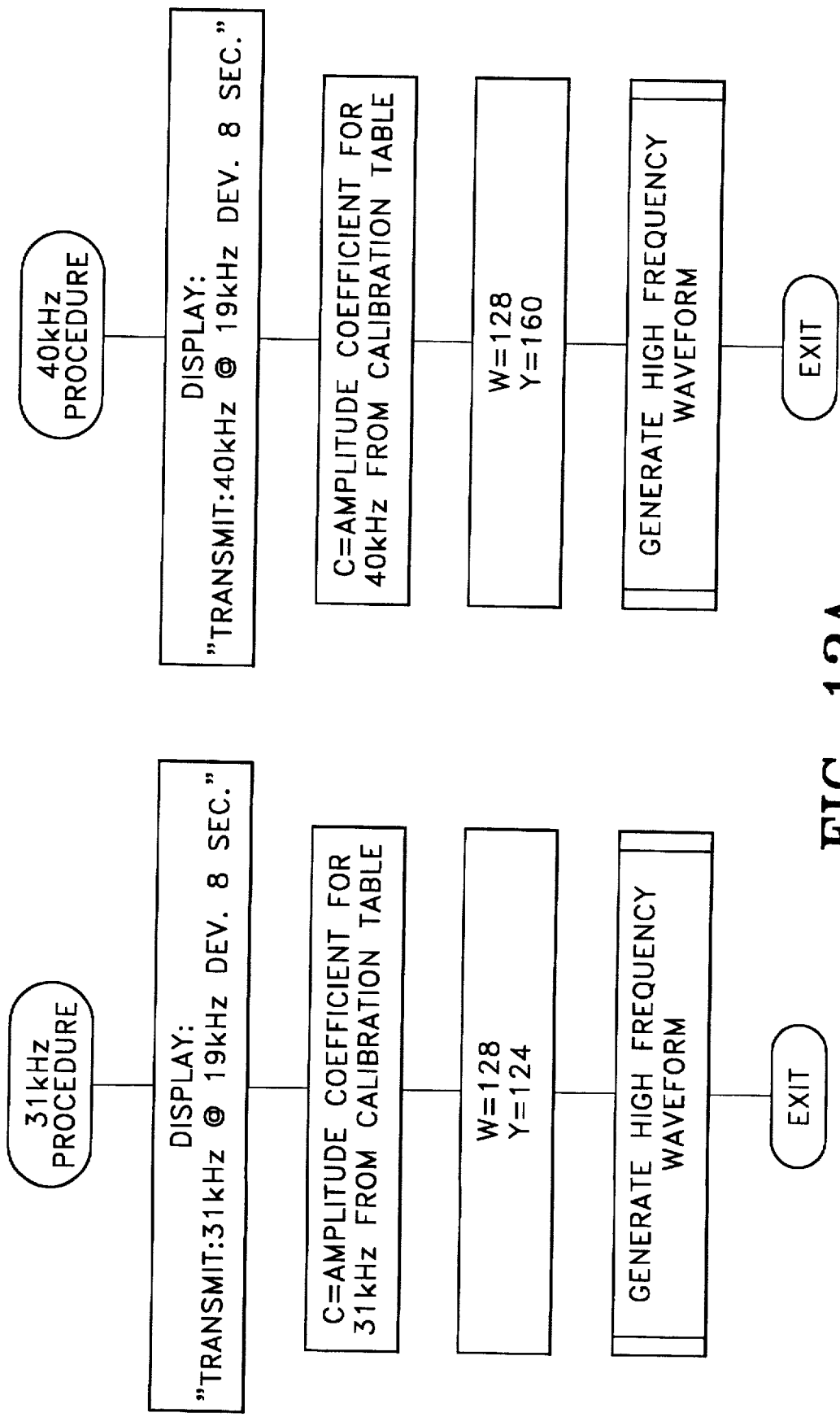
Figure 12B:
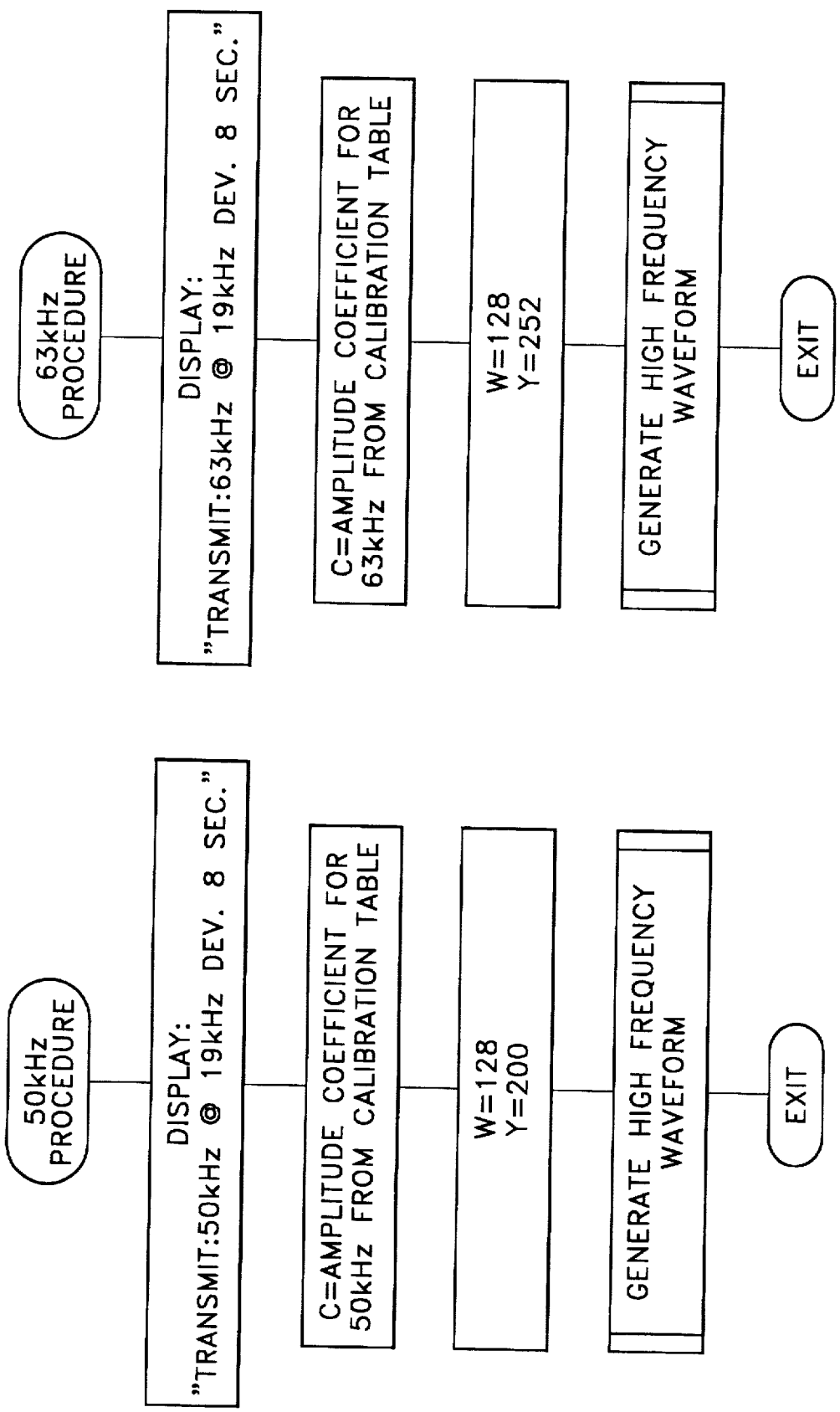
Figure 13A:
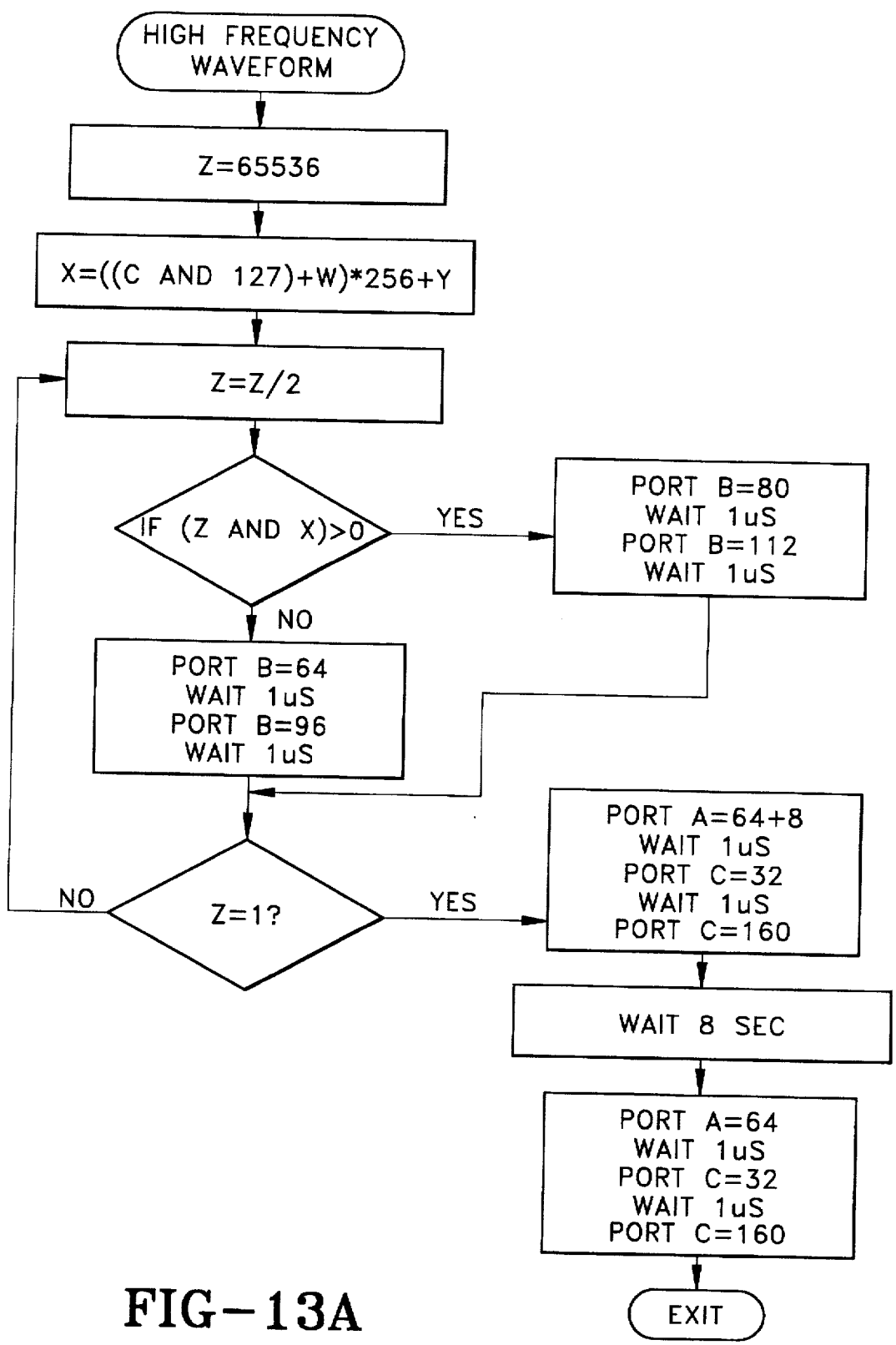

FIGS. 11 and 12 in combination show the procedures used when a high frequency (8,000 to 63,000 Hz) menu item is selected. All of the segments of FIGS. 11 and 12 are similar in nature and the 10 kHz procedure of FIG. 11 will be explained. Upon depressing 10 kHz button on the soft menu, "TRANSMIT: 10 kHZ @ 19 KHZ DEV. 8 SEC." is displayed on the LCD display 2. The amplitude coefficient for 10 kHz at 19 kHz deviation is copied from the calibration table into the variable "C". A variable W is set to 0. This represents using the 1st set of anti-distorted high frequency waveform. The variable "Y" is set to 40 representing the desired frequency of 10 kHz (40×250 Hz/step=10 KHz). The parameters are now sent to the high frequency hardware section by the following routine described in FIGS. 13A and 13B. Variable "Z" is set to 65536 as shown in FIG. 13A. Variable "X" is equal to ((C AND 127)+W)*256+Y, Variable Z=Z/2. IF (Z and X)>0 then port B is set to 80, after 1 µs delay, port B is set to 12. If the condition (If (Z and X) is>0) is false then Port B is set to 64. After 1 uS delay, Port B is set to 96. This clocks a 1 (one) to the serial shift register (13) if the condition is true or a zero into the shift register (13) if the condition is false. This paragraph is repeated until Z equals 1.

Port A is set to 72. After a 1 uS delay, Port C is set to 32 and after another 1 uS delay port C is set to 160 which, in turn, sets the LED on, sets the tri-state buss to the high frequency section and enables the high frequency clock. After 8 seconds, Port A is set to 64 a 1 µs delay is encountered, port C is set to 32, a 1 µs delay is then again encountered and Port C is set to 160 which, in turn, turns of the LED, sets the tri-state buss 23 back to the low frequency mode and inhibits the clock from toggling the states in the high frequency section which, in turn, reduces power drawn by operating the microprocessor 1 in the static mode by only operating the microprocessor 1 in the dynamic mode when in use.

Figure 13B:
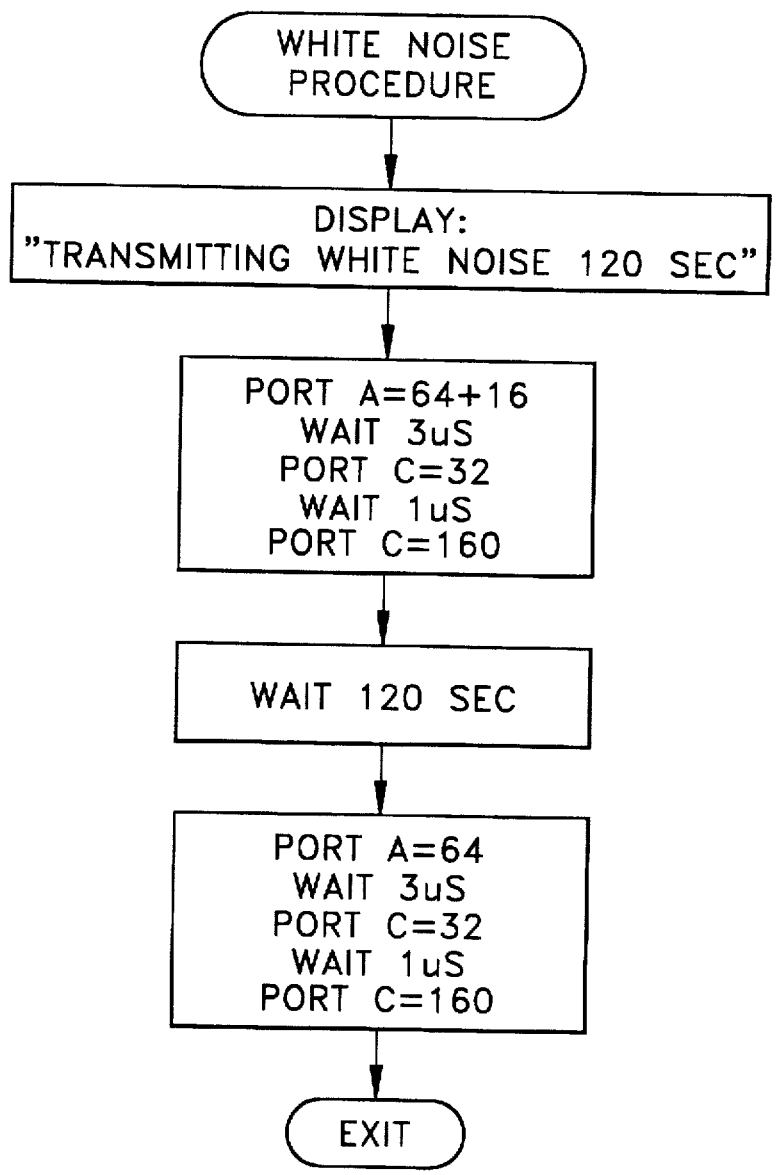

The white noise procedure is shown in FIG. 13B and operates as follows: Upon depressing the white noise button on the soft menu, "TRANSMITTING WHITE NOISE 120 SEC." is displayed on the LCD display 2. Port A is set to 80. After a 3 µs delay, Port C is set to 32 and after another 1 µs delay, port C is set to 160 which sets the LED on, sets the tri-state buss 23 to the white noise section and enables the white noise clock. After 120 seconds, Port A is set to 64, a 3 μs delay is encountered, Port C is set to 32, a 1 uS delay is then encountered, port C is set to 160 which, in turn, turns off the LED, sets the tri-state buss 23 back to the low frequency mode and inhibits the clock from toggling the states in the white noise section which, in turn, reduces power drawn by operating the microprocessor 1 in the static mode but rather only operates the microprocessor 1 in the dynamic mode when in use.

Figure 14:
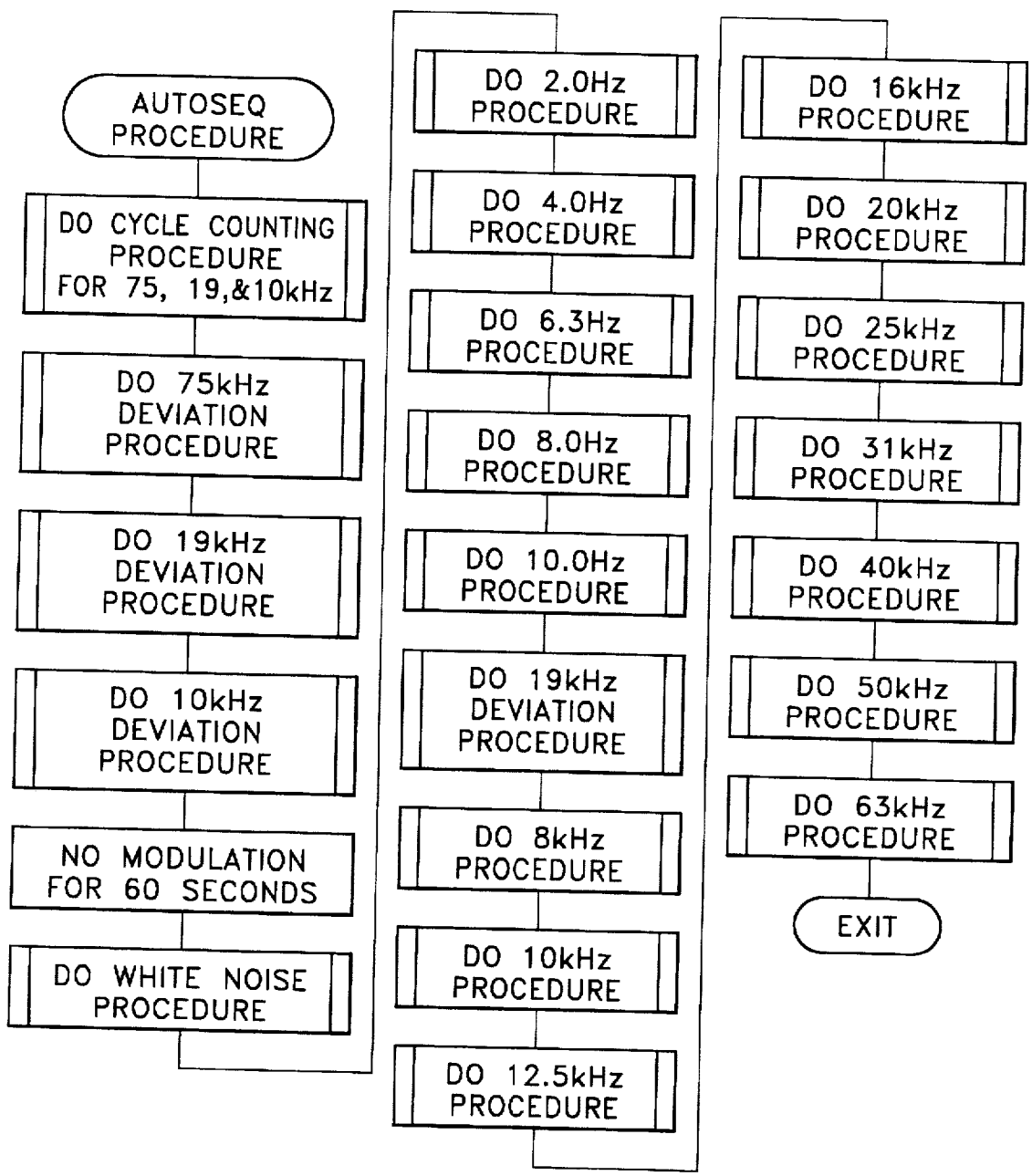

When the separate "Auto Sequence" button is depressed, a predefined sequence of events occurs as shown in FIG. 14. First the cycle counting procedure is executed to recalibrate the system for component aging and temperature drifts. The following routines are then executed in sequential order: 75 kHz, 19 kHz, 10 kHz deviation @ 100 hertz of modulation. No modulation for 60 seconds. White noise for 120 seconds. Modulation frequency of 2.0, 4.0, 6.3, 8.0, 10.0 Hz and 100 Hz at 19 kHz deviation. Modulation frequency of 8, 10, 12.5, 16, 20, 25, 31, 40, 50, and 63 KHz at 19 KHz deviation. The procedure then exits to the main menu of FIG. 6.

Figure 15:
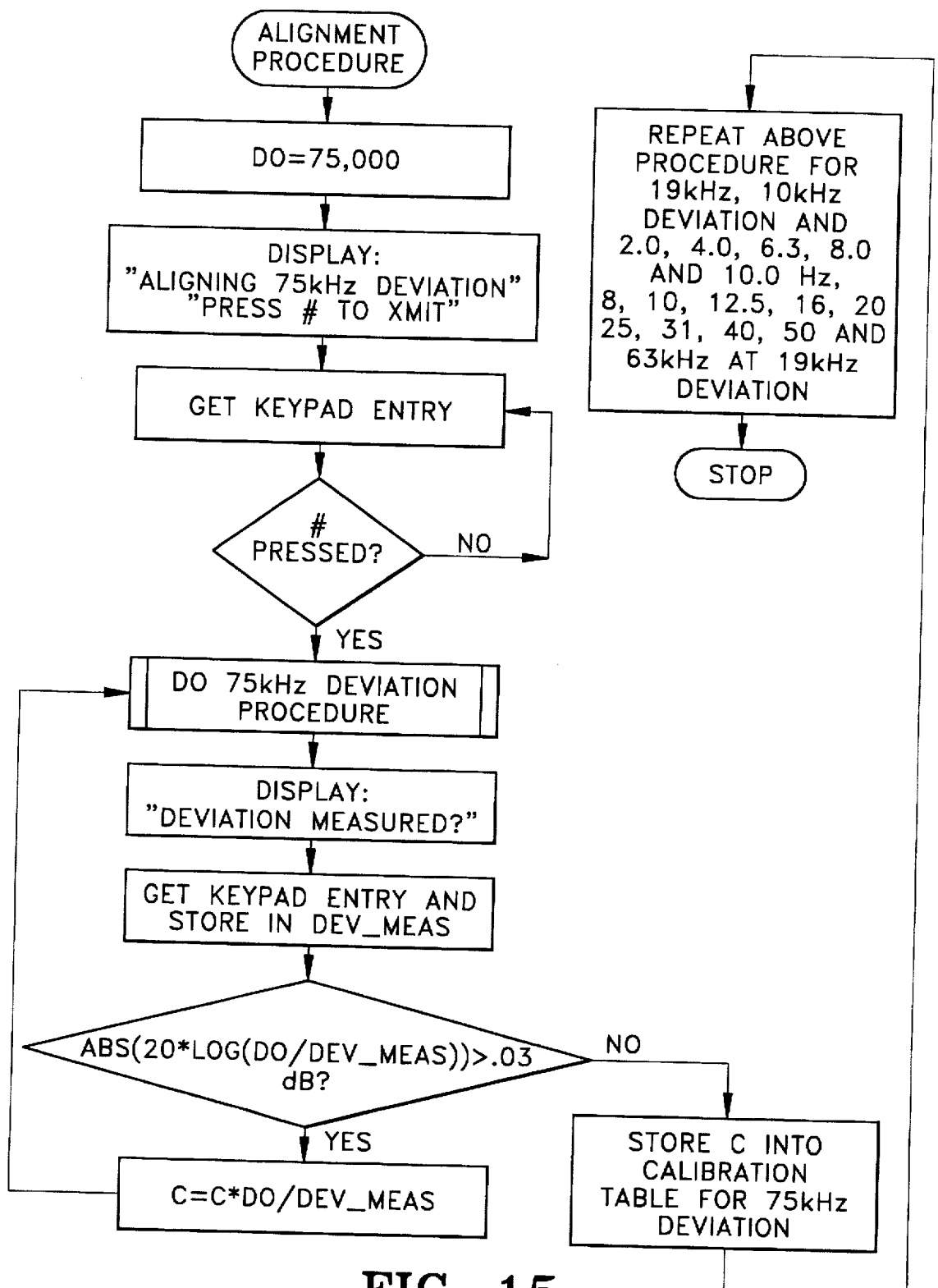

The calibration/Alignment procedure is done during maintenance at a 1 year interval and is shown in FIG. 15. The variable "D0" is set to 75000. The LCD displays "Aligning 75 kHz deviation. Press # to XMIT". The keypad is scanned until the # button is depressed.

The 75 kHz procedure is executed after the # button is depressed and generates a modulated waveform. During this time while the modulator waveform is present, the operator measures the deviation with a HP 8901 Deviation meter and enters the measured result into the keypad. The microprocessor calculates the dB error in 20*LOG(D0/dev_measured). If the error is greater than 0.03 dB the calibration table entry "C" is modified to C=C*D0/Dev_measured) and the 75 KHz procedure is repeated otherwise the new value of "C" is stored in the calibration table for 75 kHz deviation in a nonvolatile memory.

Figure 16:
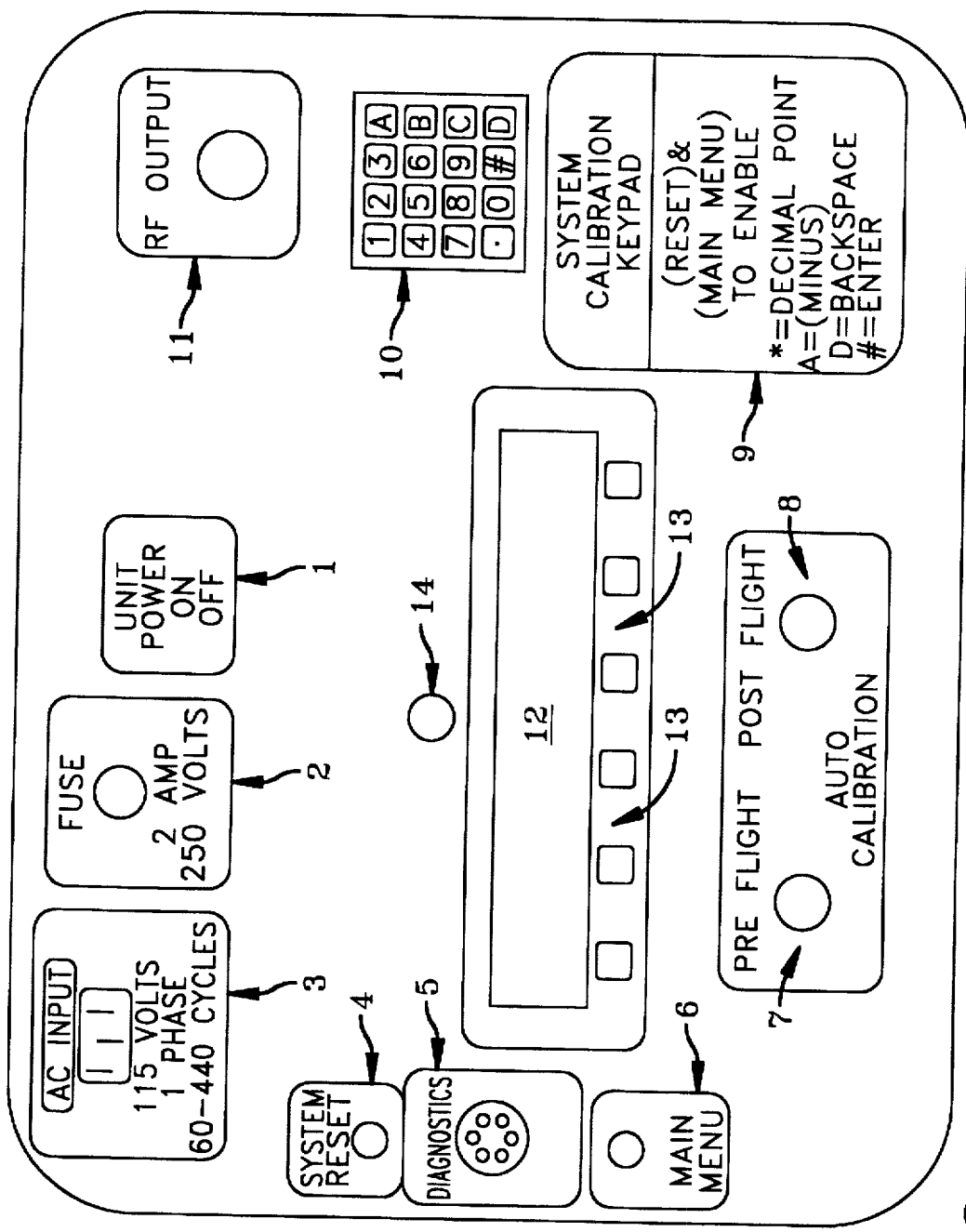
FIG. 16 is the front panel layout of an embodiment of the VHF/FM calibration tone generator.

The above 75 KHz procedure is repeated for all the predefined modulation/deviations sets (19 kHz, 10 kHz deviation at 100 Hz modulation and 2.0 Hz to 63 kHz modulation at 19 kHz deviation). An illustration of a sample prototype is shown in FIG. 16, with a layout of the front panel having numbered elements described as follows:

1. UNIT POWER SWITCH: Turns the calibrator on or off.
2. FUSE HOLDER (2 AMP 250 VOLTS)
3. AC POWER INPUT 115V, 60-440 CYCLES/SINGLE PHASE
4. SYSTEM RESET: Resets entire system to main menu even if transmitter is on. This function is also used to access the verification/alignment sequence.
5. DIAGNOSTICS: This connector is used for equipment maintenance.
6. MAIN MENU: Returns the system to the main menu any time transmitter is off.
7. PRE FLIGHT CALIBRATION: Runs a 5 point calibration and the extended low and extended high frequency calibration in approx. 12 minutes. Also used to access the verification and alignment procedure.
8. POST FLIGHT CALIBRATION: Runs a 5 point calibration sequence. This button additionally will activate the sequence required for the FACS routine.
9. KEYPAD LABEL: Identifies the symbols used on the keypad for verification/alignment routines.
10. KEYPAD: used in the verification and align sequence to enter numerical correction factors.
11. RF OUTPUT CONNECTOR: output connected to modulation meter or receiver input. No attenuator required when connecting to test equipment. 30 dB attenuator is required when connecting to the receiver input.
12. DISPLAY: Backlight displays the current mode of operation and used in conjunction with PUSH BUTTON MENU (13) for soft menu selections.
13. PUSH BUTTON MENU: used in conjunction with DISPLAY (12), to execute a manual calibration procedure displayed above the push button.
14. LIGHT: Light will turn on during modulation of the carrier and off when the carrier is unmodulated.

What is claimed is:

1. A calibrated VHF/FM source for generating calibration tones for correcting tape recorder and receiver errors comprising:

a modulation frequency generator having an output and an input and a control interface, said modulation frequency generator generating a user selected modulation frequency having variable amplitudes;

a VHF-FM modulator having a voltage controlled oscillator with a fixed RF carrier and said voltage controlled oscillator having a VVC diode with a DC voltage applied thereto, said voltage controlled oscillator connected by dc coupling to the output of said modulation frequence generator, said voltage controlled oscillator modulating the fixed RF carrier at the modulation frequency and at selected deviations according to the amplitude of the modulation frequency and transmitting these modulations as a series of VHF-FM receiver/tape calibration tones to an output serving as the output of the calibrated VHF/FM source;

a deviation corrector connected to the output of the calibrated VHF/FM source and to the input of the modulation frequency generator, said deviation corrector recording a profile of the VHF-FM receiver/tape calibration tones by counting shifts in frequency generated by the DC voltage being applied to the VVC diode, said deviation corrector modifying the modulation frequency amplitude in accordance with said profile so as to correct for nonlinear properties of the VVC diode;

a display means connected to the control interface of the modulation frequency generator so as to interface with a user of the calibrated VHF/FM source; and an input means connected to the control interface of the modulation frequency generator so as to receive user commands to control the calibrated VHF/FM source.

2. The calibrated VHF/FM source as set forth in claim 1, wherein said modulation frequency generator further comprises:

a digital to analog converter with an input and an output, said digital to analog converter converting digital amplitude data points into an analog modulation frequency; and a microprocessor with an output connected to the input of said digital to analog converter and said microprocessor generating said digital amplitude data points.

3. The calibrated VHF/FM source as set forth in claim 2, wherein said microprocessor has means for receiving and reading said profile, and if a drift in said DC voltage exceeds a predetermined value, said digital amplitude points are re-generated to compensate for said drift.

4. The calibrated VHF/FM source as set forth in claim 3, wherein said predetermined value for said drift is about 0.1V.

5. The calibrated VHF/FM source as set forth in claim 2, wherein said microprocessor further comprises a thermistor and means for periodically reading said thermistor so that if a predetermined change in temperature is sensed from one reading to another said digital amplitude data points are re-generated to compensate for said change in temperature sensed by said transistor.

6. The calibrated VHF/FM source as set forth in claim 5, wherein said predetermined change in temperature is about 5° F.

7. The calibrated VHF/FM source as set forth in claim 2, wherein the modulation frequency generator comprises the microprocessor generating low frequency digital wave points and a digital logic section generating high frequency wave points.

8. The calibrated VHF/FM source as set forth in claim 2, wherein the microprocessor controls all operations of the calibrated VHF/FM source.

9. The calibrated VHF/FM source as set forth in claim 7, wherein said digital logic section comprises:

a digital high frequency sine wave generator having a series of amplitude coefficient tables, wherein the amplitude coefficients of the modulation frequency are selectively cycled out to the digital to analog converter.

10. The calibrated VHF/FM source as set forth in claim 7, wherein said digital high frequency wave points generator further comprises:

a clock having a frequency selected to generate a desired sampling rate for a desired precision of the modulation frequency generator;

a memory means having address lines and an output data bus, said memory means containing the series of amplitude coefficient tables, each table containing a set of digital data points of a sine wave at an amplitude;

a register connected to the microprocessor and to the address lines of the memory means and containing a pointer that selects the amplitude coefficient table for a selected amplitude;

an increment means connected to the clock and to the address lines of the memory means containing the amplitude coefficient tables;

a register containing a step size connected to the increment means, said step size corresponding to the selected frequency such that when the increment means increments at that step size, within the amplitude coefficient table, at the frequency rate of the clock, the digital data points of the modulation frequency are generated at the output data bus of the memory means.

11. The calibrated VHF/FM source as set forth in claim 10, wherein said memory means further comprises:

a plurality of series of amplitude coefficient tables with each series containing a precomputed anti-distortion coefficient to correct for harmonic distortions in the output of the calibrated VHF/FM source.

12. The calibrated VHF/FM source as set forth in claim 11, wherein said memory means further comprises:

a plurality of series of amplitude coefficient tables with each series containing precomputed anti-distortion coefficients to correct for 2nd harmonic distortions in the output of the calibrated VHF/FM source.

13. The calibrated VHF/FM source as set forth in claim 10, wherein said memory means containing a series of amplitude coefficient tables is an EPROM.

14. The calibrated VHF/FM source as set forth in claim 7, wherein said digital logic section further comprises;

a white noise generator having a digital shift register with an input line and output lines and a random number generated by the random digital setting of the registers at start up and a random sequence of numbers generated by connecting random output lines of the digital shift register to the input line of the white noise generator and cycling out a random sequence of numbers.

15. The calibrated VHF/FM source as set forth in claim 1, wherein said deviation corrector comprises;

a prescaler having an output, an input connected to the output of the calibrated VHF/FM source, and said prescaler producing a tone divided down from the frequency of the transmitted calibration tone;

a counter having an output, a gated controlled input connected to the output of the prescaler, a counter control interface, and means for selectively inputting the divided down tone of the prescaler to the gated controlled input;

a register having an output, a control interface and an input, said resister being connected to the output of the counter and receiving a digital cycle count of the divided down tone therefrom;

a digital computing means connected to the output of the register;

a digital control means connected to the gated controlled input of the counter, to the control interface of the counter, and to the control interface of the register, said digital control means enabling a count and notifying the digital computing means that a valid digital cycle count is available so that the digital computing means then computes the difference between a desired deviation and a measured deviation derived from the digital cycle count.

16. The calibrated VHF/FM source as set forth in claim 11, wherein said digital computing means calculates the measured deviation as a current cycle count minus a previous cycle count times 1.90740 times 5.

17. The calibrated VHF/FM source as set forth in claim 16, wherein said digital computing means calculates an error between the desired deviation and the measured deviation as 20 times logarithm base ten times the measured deviation divided by the desired deviation.

18. The calibrated VHF/FM source as set forth in claim 16, wherein said digital computing means calculates the amplitude coefficient as equaling a current amplitude coefficient, derived from the previous cycle count, times the desired deviation divided by the measured deviations and if the measured deviation error is greater than 0.03 dB, the amplitude coefficient is repeatedly adjusted by multiplying the current amplitude coefficient by the desired deviation divided by the measured deviation until the measured deviation error is less than 0.03 dB.

19. The calibrated VHF/FM source as set forth in claim 1, wherein said input means receives a user command comprising:

a modulated fixed RF carrier of 167.5 Mhz at 75.0 Khz or 19 Khz, or 10 Khz deviations at a modulation frequency of 100 Hz.

20. The calibrated VHF/FM source as set forth in claim 1, wherein said input means receives a user command comprising:

a modulated fixed RF carrier of 167.5 Mhz at a deviation of 19 Khz and modulations at selected frequencies between 2 Hz to 63 Khz or at broadband noise.

* * * * *